United States Patent
Biederman et al.

(10) Patent No.: US 12,542,984 B2
(45) Date of Patent: Feb. 3, 2026

(54) METHOD AND APPARATUS TO USE A PASSIVE OPTICAL NETWORK TO COMMUNICATE BETWEEN SERVERS IN A DATACENTER

(71) Applicant: Intel Corporation, Santa Clara, CA (US)

(72) Inventors: Daniel Christian Biederman, Saratoga, CA (US); Renuka V. Sapkal, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 796 days.

(21) Appl. No.: 17/709,173

(22) Filed: Mar. 30, 2022

(65) Prior Publication Data

US 2022/0232301 A1    Jul. 21, 2022

(51) Int. Cl.
| | |
|---|---|
| *H04B 10/00* | (2013.01) |
| *H04B 10/27* | (2013.01) |
| *H04J 14/02* | (2006.01) |
| *H04Q 11/00* | (2006.01) |
| *H04J 14/00* | (2006.01) |

(52) U.S. Cl.
CPC ......... *H04Q 11/0067* (2013.01); *H04B 10/27* (2013.01); *H04J 14/0282* (2013.01)

(58) Field of Classification Search
CPC .................................................... H04B 10/272
See application file for complete search history.

(56) References Cited

U.S. PATENT DOCUMENTS

2017/0317778 A1*  11/2017  Lam .................... H04J 14/0247
2020/0211682 A1*   7/2020  Zohar .................... A61B 5/445

OTHER PUBLICATIONS

Gu et al., "Software Defined Flexible and Efficient Passive Optical Networks for Intra-Datacenter Communications", Jun. 5, 2014, Optical Switching and Networking, vol. 14, 289-302 (Year: 2014).*
Cheng, Yuxin et al, "POTORI: A Passive Optical Top-of-Tack Interconnect Architecture for Data Centers," vol. 9, No. 5/May 2017, J. Opt. Commun. Netw., 11 pages.
Gong, Yu et al, "Passive Optical Interconnects at Top of the Rack for Data Center Networks," ONDM, May 19-22, 2014, Stockholm, Sweden, 6 pages.
Kachris et al, "Power Consumption evaluation of Hybrid WDM PON Networks for Data Centers", Athens Information Technology, 2011 16th European Conference on Networks and Optical Communications, Aug. 2011, 4 pages.
Schares et al, "Optics in Future Data Center Networks", 2010 18th IEEE Symposium on High Performance Interconnects, Jul. 27, 2010, 5 pages.

* cited by examiner

*Primary Examiner* — Daniel G Dobson
(74) *Attorney, Agent, or Firm* — Essential Patents Group, LLP; Christopher K. Gagne

(57) ABSTRACT

A passive optical network is used for communications in a data center between an Optical Line Terminal (OLT) in an Ethernet switch and an Optical Network Terminal (ONT) in a compute node in a server. The passive optical network reduces the latency from microseconds to single digit nanoseconds in both upstream and downstream directions that can result in an increase in application performance. In addition, because the passive optical network does not use active components, the passive optical network has a reduced Mean Time Between Failures that can be decades or centuries.

20 Claims, 20 Drawing Sheets

METHOD AND APPARATUS TO USE A PASSIVE OPTICAL NETWORK TO COMMUNICATE BETWEEN SERVERS IN A DATACENTER

BACKGROUND

Cloud computing provides access to servers, storage, databases, and a broad set of application services over the Internet. A cloud service provider offers cloud services such as network services and business applications that are hosted in servers in one or more data centers that can be accessed by companies or individuals over the Internet. Hyperscale cloud-service providers typically have hundreds of thousands of servers. Each server in a hyperscale cloud includes storage devices to store user data, for example, user data for business intelligence, data mining, analytics, social media and micro-services. The cloud service provider generates revenue from companies and individuals (also referred to as tenants) that use the cloud services.

Disaggregated computing or Composable Disaggregated Infrastructure (CDI) is an emerging technology that makes use of high bandwidth, low-latency interconnects to aggregate compute, storage, memory, and networking fabric resources into shared resource pools that can be provisioned on demand.

BRIEF DESCRIPTION OF THE DRAWINGS

Features of embodiments of the claimed subject matter will become apparent as the following detailed description proceeds, and upon reference to the drawings, in which like numerals depict like parts, and in which:

Figure 1:
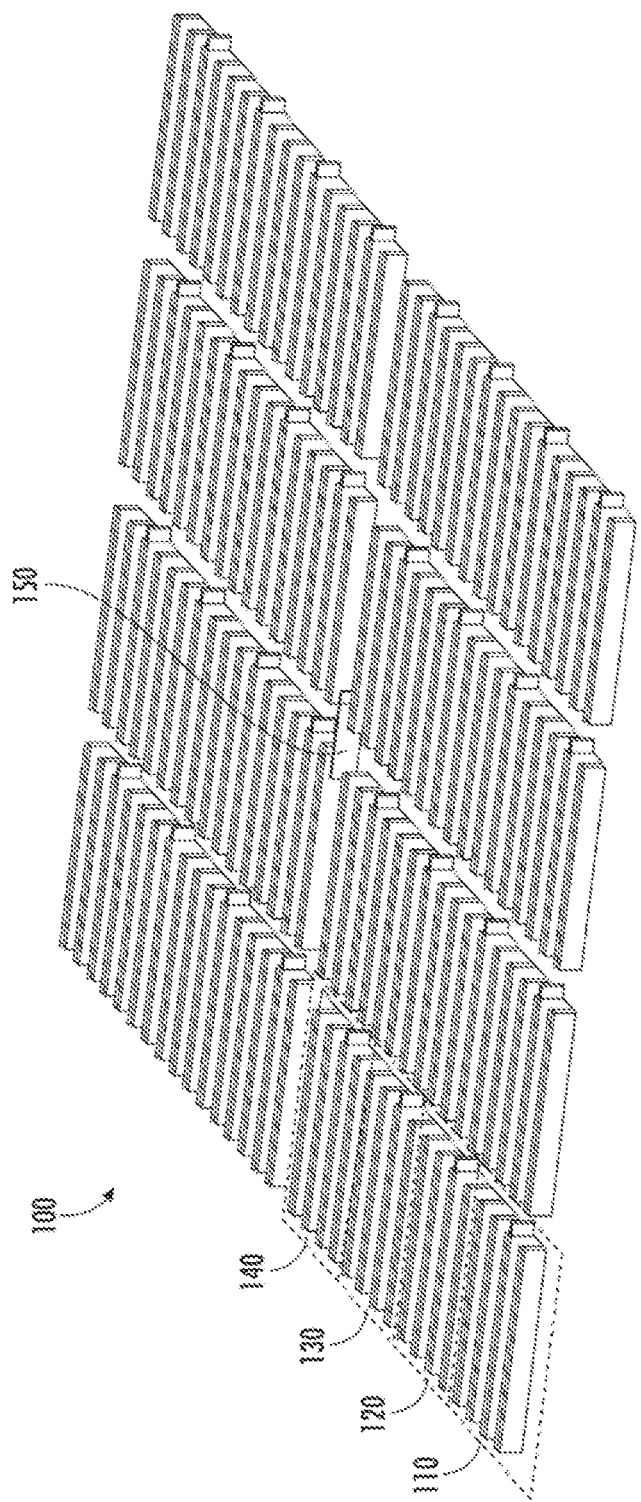
FIG. 1 is a simplified diagram of at least one embodiment of a data center for executing workloads with disaggregated resources.

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DESCRIPTION OF EMBODIMENTS

High speed networks are essential for supporting business, providing communication, and delivering entertainment. To increase network speed, Cloud service providers (CSPs) are evolving their hardware platforms by offering central processing units (CPUs), general purpose graphics processing units (GPGPUs), custom XPUs, and pooled storage and memory (for example, DDR, persistent memory, 3D XPoint, Optane, or memory devices that use chalcogenide glass). CSPs are vertically integrating these with custom orchestration control planes to expose these as services to users.

Cloud Service Providers (CSPs) can remove slow features from the CPU and put them in an Infrastructure Processing Unit (IPU). An Infrastructure Processing Unit (IPU) is a programmable network device that intelligently manages system-level resources by securely accelerating networking and storage infrastructure functions in a disaggregated computing system data center. Systems can be composed differently based at least on how functions are mapped and offloaded.

However, as IPUs communicate via traditional coaxial cable/twisted pair based Ethernet or an optical port, there can be microseconds of latency per communication direction (upstream/downstream) of the IPU in the data center. This latency reduces performance of data center applications. Additionally, with Exa-scale and Zeta-scale Computing, the Mean Time Between Failures (MTBF) increases based on the number of components. An increase in MTBF can be measured in seconds resulting in a reduction of performance of data center applications.

To reduce latency, a passive optical network is used for communications between an Ethernet switch and IPUs in compute nodes in servers. A port in the Ethernet switch is an Optical Line Terminal (OLT). An Ethernet port in a compute node in the server is an Optical Network Terminal (ONT). In one embodiment, the passive optical network is a printed circuit board. In another embodiment, the passive optical network is an optical wiring harness that includes an optical splitter.

A passive optical network is an optical fiber network that uses passive components, for example, splitters and combiners. The passive optical network does not use active components, for example, amplifiers, repeaters, shaping circuits. The passive optical network can be a Gigabit Passive Optical Network(GPON) or an Ethernet Passive Optical Network (EPON). The passive optical network uses wavelength division multiplexing (WDM) with one wavelength used for downstream traffic (for example, 1490 nanometer (nm)) and another wavelength (for example, 1310 nm) used for upstream traffic.

EPON uses ethernet packets, fiber optic cables, and single protocol layer. One gigabit EPON uses standard 802.3 Ethernet frames with symmetric 1 gigabit per second upstream and downstream rates. 10 Gbit/s EPON (10G-EPON) supports simultaneous operation of 10 Gbit/s on one wavelength and 1 Gbit/s on a separate wavelength for the operation of IEEE 802.3av and IEEE 802.3ah on the same passive optical network. GPON uses ATM cells and is based on the TU-TG.984.x standard for broadband passive optical access.

The passive optical network reduces the latency from microseconds to single digit nanoseconds in both upstream and downstream directions that can result in an increase in application performance. In addition, because the passive optical network does not use active components, the passive optical network has a reduced MTBF that can be decades or centuries.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

FIG. 1 depicts a data center 100 in which disaggregated resources may cooperatively execute one or more workloads (for example, applications on behalf of users (customers)) that includes multiple pods 110, 120, 130, 140, a pod being or including one or more rows of racks. Of course, although data center 100 is shown with multiple pods, in some embodiments, the data center 100 may be embodied as a single pod. As described in more detail herein, each rack houses multiple nodes, some of which may be equipped with one or more type of resources (for example, memory devices, data storage devices, accelerator devices, general purpose processors). Resources can be logically coupled to form a composed node or composite node, which can act as, for example, a server to perform a job, workload or microservices. In the illustrative embodiment, the nodes in each pod 110, 120, 130, 140 are connected to multiple pod switches (for example, switches that route data communications to and from nodes within the pod). The pod switches, in turn, connect with spine switches 150 that switch communications among pods (for example, the pods 110, 120, 130, 140) in the data center 100. In some embodiments, the nodes may be connected with a fabric using Intel® Omni-Path technology. In other embodiments, the nodes may be connected with other fabrics, such as InfiniBand or Ethernet or PCI Express or direct optical interconnect. As described in more detail herein, resources within nodes in the data center 100 may be allocated to a group (referred to herein as a "managed node") containing resources from one or more nodes to be collectively utilized in the execution of a workload. The workload can execute as if the resources belonging to the managed node were located on the same node. The resources in a managed node may belong to nodes belonging to different racks, and even to different pods 110, 120, 130, 140. As such, some resources of a single node may be allocated to one managed node while other resources of the same node are allocated to a different managed node (for example, one processor assigned to one managed node and another processor of the same node assigned to a different managed node).

A data center comprising disaggregated resources, such as data center 100, can be used in a wide variety of contexts, such as enterprise, government, cloud service provider, and communications service provider (for example, Telcos), as well in a wide variety of sizes, from cloud service provider mega-data centers that consume over 60,000 sq. ft. to single- or multi-rack installations for use in base stations.

The disaggregation of resources to nodes comprised predominantly of a single type of resource (for example, compute nodes comprising primarily compute resources, memory nodes containing primarily memory resources), and the selective allocation and deallocation of the disaggregated resources to form a managed node assigned to execute a workload improves the operation and resource usage of the data center 100 relative to typical data centers comprised of hyperconverged servers containing compute, memory, storage and perhaps additional resources in a single chassis. For example, because nodes predominantly contain resources of a particular type, resources of a given type can be upgraded independently of other resources. Additionally, because different resource types (processors, storage, accelerators, etc.) typically have different refresh rates, greater resource utilization and reduced total cost of ownership may be achieved. For example, a data center operator can upgrade the processors throughout their facility by only swapping out the compute nodes. In such a case, accelerator and storage resources may not be contemporaneously upgraded and, rather, may be allowed to continue operating until those resources are scheduled for their own refresh. Resource utilization may also increase. For example, if managed nodes are composed based on requirements of the workloads that will be running on them, resources within a node are more likely to be fully utilized. Such utilization may allow for more managed nodes to run in a data center with a given set of resources, or for a data center expected to run a given set of workloads, to be built using fewer resources.

Figure 2:
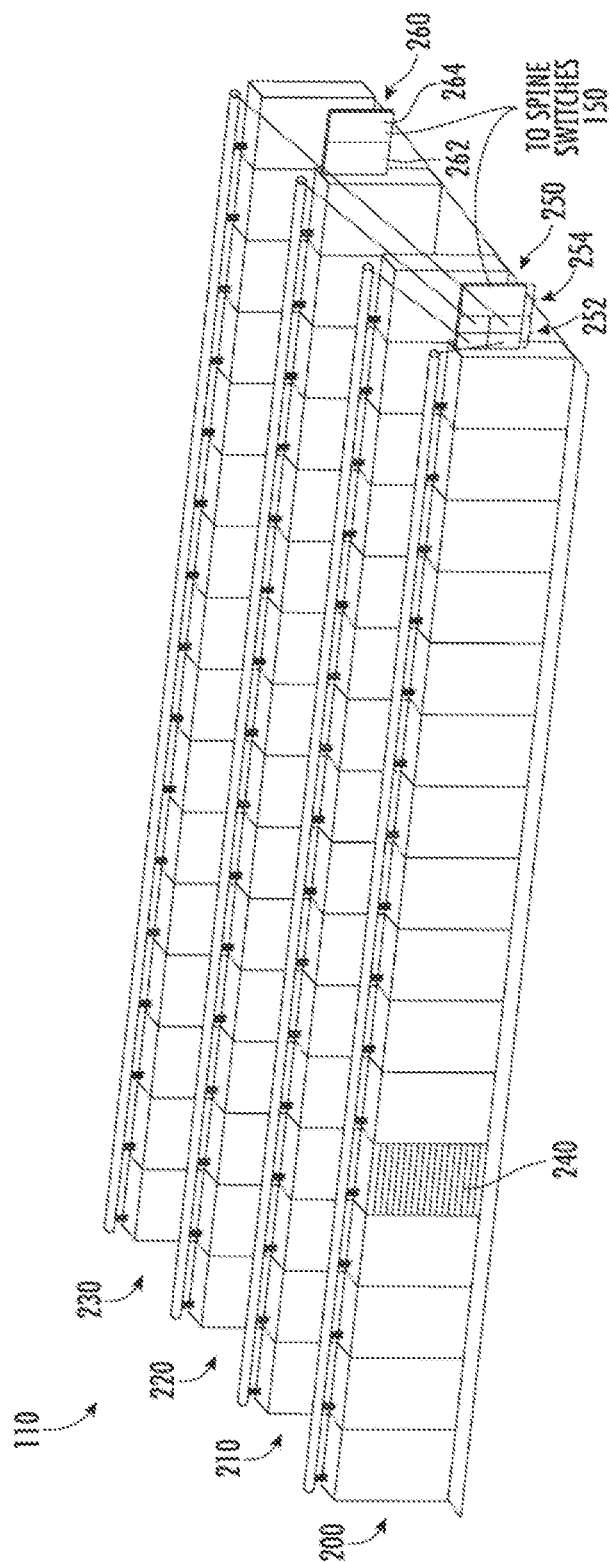
FIG. 2 is a simplified diagram of at least one embodiment of a pod that may be included in a data center.

FIG. 2 depicts the pod 110 in data center 100. The pod 110 can include a set of rows 200, 210, 220, 230 of racks 240. Each rack 240 may house multiple nodes (for example, sixteen nodes) and provide power and data connections to the housed nodes, as described in more detail herein. In the illustrative embodiment, the racks in each row 200, 210, 220, 230 are connected to multiple pod switches 250, 260. The pod switch 250 includes a set of ports 252 to which the nodes of the racks of the pod 110 are connected and another set of ports 254 that connect the pod 110 to the spine switches 150 to provide connectivity to other pods in the data center 100. Similarly, the pod switch 260 includes a set of ports 262 to which the nodes of the racks of the pod 110 are connected and a set of ports 264 that connect the pod 110 to the spine switches 150. As such, the use of the pair of switches 250, 260 provides an amount of redundancy to the pod 110. For example, if either of the switches 250, 260 fails, the nodes in the pod 110 may still maintain data communication with the remainder of the data center 100 (for example, nodes of other pods) through the other switch 250, 260. Furthermore, in the illustrative embodiment, the switches 150, 250, 260 may be embodied as dual-mode optical switches, capable of routing both Ethernet protocol communications carrying Internet Protocol (IP) packets and communications according to a second, high-performance link-layer protocol (for example, PCI Express or Compute Express Link) via optical signaling media of an optical fabric.

It should be appreciated that each of the other pods 120, 130, 140 (as well as any additional pods of the data center 100) may be similarly structured as, and have components similar to, the pod 110 shown in and described in regard to FIG. 2 (for example, each pod may have rows of racks housing multiple nodes as described above). Additionally, while two pod switches 250, 260 are shown, it should be understood that in other embodiments, each pod 110, 120, 130, 140 may be connected to a different number of pod switches, providing even more failover capacity. Of course, in other embodiments, pods may be arranged differently than the rows-of-racks configuration shown in FIGS. 1-2. For example, a pod may be embodied as multiple sets of racks in which each set of racks is arranged radially, for example, the racks are equidistant from a center switch.

Figure 3:
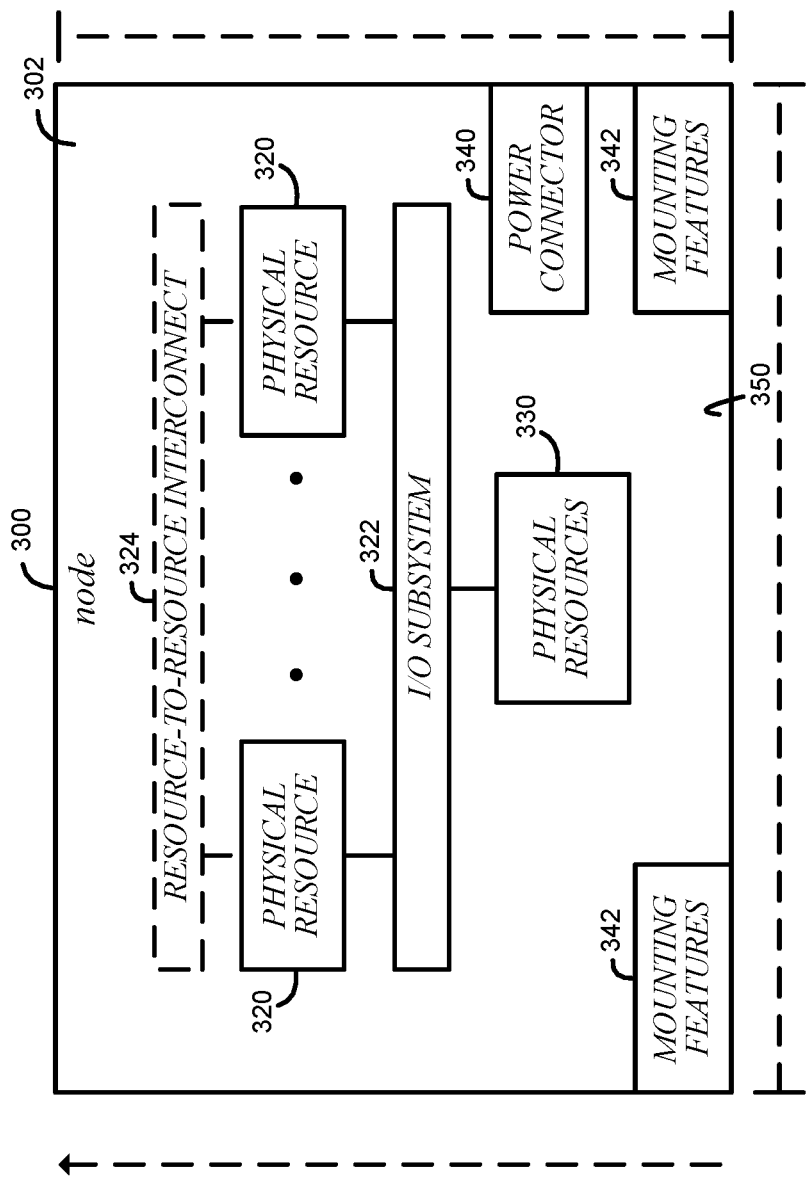
FIG. 3 is a simplified block diagram of at least one embodiment of a top side of a node.

Referring now to FIG. 3, node 300, in the illustrative embodiment, is configured to be mounted in a corresponding rack 240 of the data center 100 as discussed above. In some embodiments, each node 300 may be optimized or otherwise configured for performing particular tasks, such as compute tasks, acceleration tasks, data storage tasks, etc. For example, the node 300 may be embodied as a compute node 500 as discussed below in regard to FIG. 5, an accelerator node 600 as discussed below in regard to FIG. 6, a storage node 700 as discussed below in regard to FIG. 7, or as a node optimized or otherwise configured to perform other specialized tasks, such as a memory node 800, discussed below in regard to FIG. 8. Each rack 240 may contain one or more nodes of a single or multiple node types—compute, storage, accelerator, memory, or others.

As discussed above, the illustrative node 300 includes a circuit board substrate 302, which supports various physical resources (for example, electrical components) mounted thereon.

As discussed above, the illustrative node 300 includes one or more physical resources 320 mounted to a top side 350 of the circuit board substrate 302. Although two physical resources 320 are shown in FIG. 3, it should be appreciated that the node 300 may include one, two, or more physical resources 320 in other embodiments. The physical resources 320 may be embodied as any type of processor, controller, or other compute circuit capable of performing various tasks such as compute functions and/or controlling the functions of the node 300 depending on, for example, the type or intended functionality of the node 300. For example, as discussed in more detail below, the physical resources 320 may be embodied as high-performance processors in embodiments in which the node 300 is embodied as a compute node, as accelerator co-processors or circuits in embodiments in which the node 300 is embodied as an accelerator node, storage controllers in embodiments in which the node 300 is embodied as a storage node, or a set of memory devices in embodiments in which the node 300 is embodied as a memory node.

The node 300 also includes one or more additional physical resources 330 mounted to the top side 350 of the circuit board substrate 302. In the illustrative embodiment, the additional physical resources include a network interface controller (NIC) as discussed in more detail below. Of course, depending on the type and functionality of the node 300, the physical resources 330 may include additional or other electrical components, circuits, and/or devices in other embodiments.

The physical resources 320 can be communicatively coupled to the physical resources 330 via an input/output (I/O) subsystem 322. The I/O subsystem 322 may be embodied as circuitry and/or components to facilitate input/output operations with the physical resources 320, the physical resources 330, and/or other components of the node 300. For example, the I/O subsystem 322 may be embodied as, or otherwise include, memory controller hubs, input/output control hubs, integrated sensor hubs, firmware devices, communication links (for example, point-to-point links, bus links, wires, cables, waveguides, light guides, printed circuit board traces, etc.), and/or other components and subsystems to facilitate the input/output operations.

In some embodiments, the node 300 may also include a resource-to-resource interconnect 324. The resource-to-resource interconnect 324 may be embodied as any type of communication interconnect capable of facilitating resource-to-resource communications. In the illustrative embodiment, the resource-to-resource interconnect 324 is embodied as a high-speed point-to-point interconnect (for example, faster than the I/O subsystem 322). For example, the resource-to-resource interconnect 324 may be embodied as a QuickPath Interconnect (QPI), an UltraPath Interconnect (UPI), PCI express (PCIe), CXL, Universal Chiplet Interconnect Express (UCIe) or other high-speed point-to-point interconnect dedicated to resource-to-resource communications.

The node 300 also includes a power connector 340 configured to mate with a corresponding power connector of the rack 240 when the node 300 is mounted in the corresponding rack 240. The node 300 receives power from a power supply of the rack 240 via the power connector 340 to supply power to the various electrical components of the node 300. That is, the node 300 does not include any local power supply (for example, an on-board power supply) to provide power to the electrical components of the node 300. The exclusion of a local or on-board power supply facilitates the reduction in the overall footprint of the circuit board substrate 302, which may increase the thermal cooling characteristics of the various electrical components mounted on the circuit board substrate 302 as discussed above. In some embodiments, voltage regulators are placed on a bottom side 450 (see FIG. 4) of the circuit board substrate 302 directly opposite of the processors 520 (see FIG. 5), and power is routed from the voltage regulators to the processors 520 by vias extending through the circuit board substrate 302. Such a configuration provides an increased thermal budget, additional current and/or voltage, and better voltage control relative to typical printed circuit boards in which processor power is delivered from a voltage regulator, in part, by printed circuit traces.

In some embodiments, the node 300 may also include mounting features 342 configured to mate with a mounting arm, or other structure, of a robot to facilitate the placement of the node 300 in a rack 240 by the robot. The mounting features 342 may be embodied as any type of physical structures that allow the robot to grasp the node 300 without damaging the circuit board substrate 302 or the electrical components mounted thereto. For example, in some embodiments, the mounting features 342 may be embodied as non-conductive pads attached to the circuit board substrate 302. In other embodiments, the mounting features may be embodied as brackets, braces, or other similar structures attached to the circuit board substrate 302. The particular number, shape, size, and/or make-up of the mounting feature 342 may depend on the design of the robot configured to manage the node 300.

Figure 4:
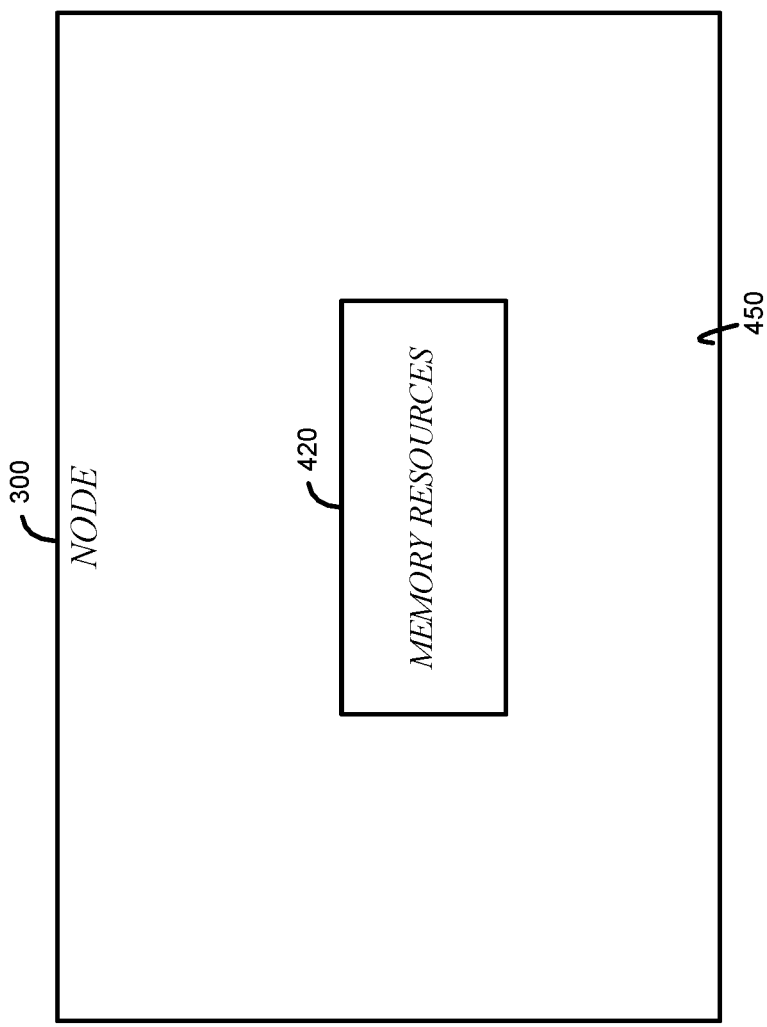
FIG. 4 is a simplified block diagram of at least one embodiment of a bottom side of a node.

Referring now to FIG. 4, in addition to the physical resources 330 mounted on the top side 350 of the circuit board substrate 302, the node 300 also includes one or more memory devices 420 mounted to a bottom side 450 of the circuit board substrate 302. That is, the circuit board substrate 302 can be embodied as a double-sided circuit board. The physical resources 320 can be communicatively coupled to memory devices 420 via the I/O subsystem 322. For example, the physical resources 320 and the memory devices 420 may be communicatively coupled by one or more vias extending through the circuit board substrate 302. A physical resource 320 may be communicatively coupled to a different set of one or more memory devices 420 in some embodiments. Alternatively, in other embodiments, each physical resource 320 may be communicatively coupled to each memory device 420.

The memory devices 420 may be embodied as any type of memory device capable of storing data for the physical resources 320 during operation of the node 300, such as any type of volatile (for example, dynamic random access memory (DRAM), etc.) or non-volatile memory. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies, for example, multi-threshold level NAND flash memory and NOR flash memory. A block can be any size such as but not limited to 2 KB, 4 KB, 5 KB, and so forth. A memory device may also include next-generation nonvolatile devices, such as Intel Optane® memory or other byte addressable write-in-place nonvolatile memory devices, for example, memory devices that use chalcogenide glass, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, the memory device may comprise a transistor-less stackable cross point architecture in which memory cells sit at the intersection of word lines and bit lines and are individually addressable and in which bit storage is based on a change in bulk resistance.

Figure 5:
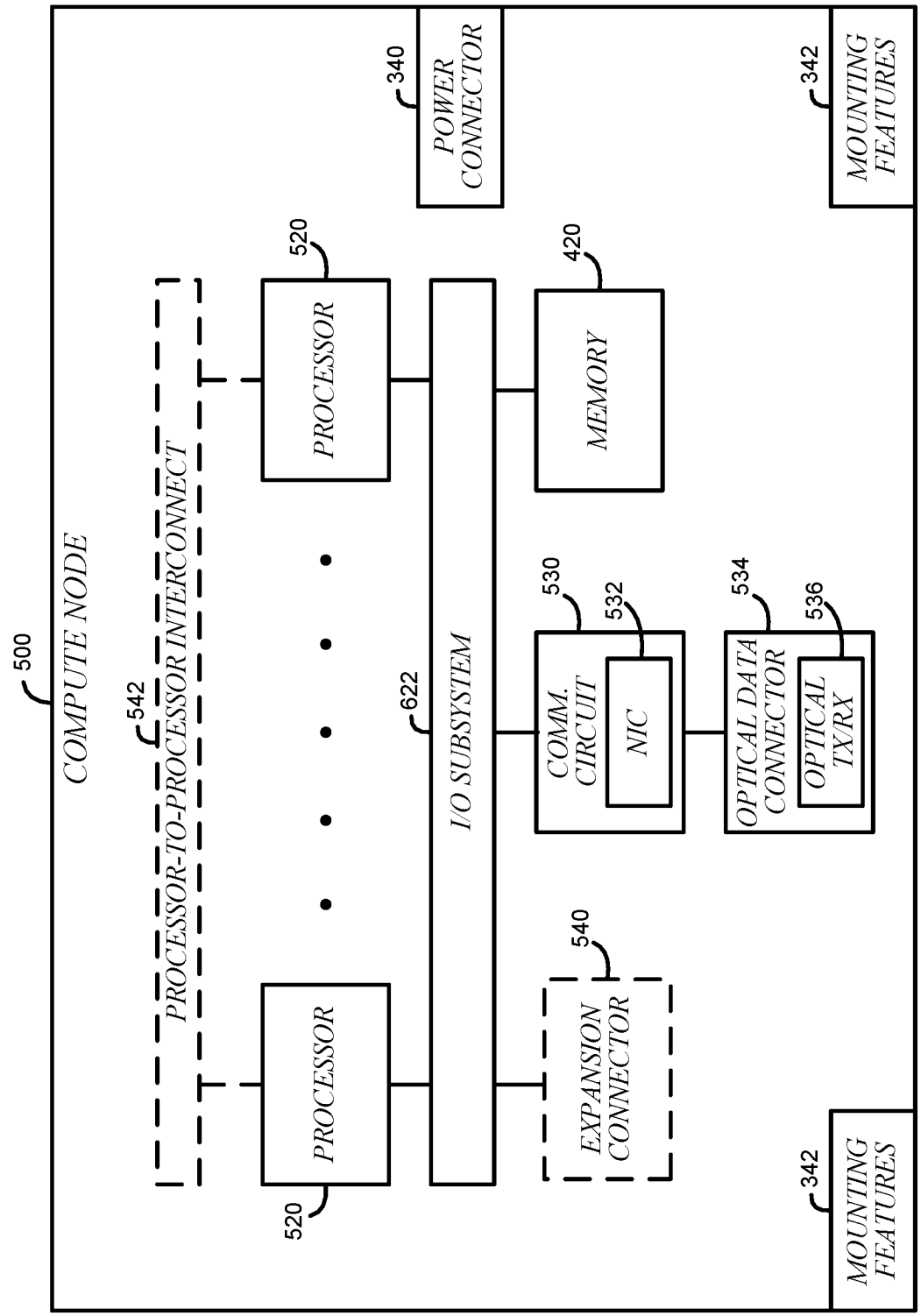
FIG. 5 is a simplified block diagram of at least one embodiment of a compute node.

Referring now to FIG. 5, in some embodiments, the node 300 may be embodied as a compute node 500. The compute node 500 can be configured to perform compute tasks. Of course, as discussed above, the compute node 500 may rely on other nodes, such as acceleration nodes and/or storage nodes, to perform compute tasks.

In the illustrative compute node 500, the physical resources 320 are embodied as processors 520. Although only two processors 520 are shown in FIG. 5, it should be appreciated that the compute node 500 may include additional processors 520 in other embodiments. Illustratively, the processors 520 are embodied as high-performance processors 520 and may be configured to operate at a relatively high power rating.

In some embodiments, the compute node 500 may also include a processor-to-processor interconnect 542. Processor-to-processor interconnect 542 may be embodied as any type of communication interconnect capable of facilitating processor-to-processor interconnect 542 communications. In the illustrative embodiment, the processor-to-processor interconnect 542 is embodied as a high-speed point-to-point interconnect (for example, faster than the I/O subsystem 322). For example, the processor-to-processor interconnect 542 may be embodied as a QuickPath Interconnect (QPI), an UltraPath Interconnect (UPI), or other high-speed point-to-point interconnect dedicated to processor-to-processor communications (for example, PCIe or CXL).

The compute node 500 also includes a communication circuit 530. The illustrative communication circuit 530 includes a network interface controller (NIC) 532, which may also be referred to as a host fabric interface (HFI). The NIC 532 may be embodied as, or otherwise include, any type of integrated circuit, discrete circuits, controller chips, chipsets, add-in-boards, daughtercards, network interface cards, or other devices that may be used by the compute node 500 to connect with another compute device (for example, with other nodes 300). In some embodiments, the NIC 532 may be embodied as part of a system-on-a-chip (SoC) that includes one or more processors, or included on a multichip package that also contains one or more processors. In some embodiments, the NIC 532 may include a local processor (not shown) and/or a local memory (not shown) that are both local to the NIC 532. In such embodiments, the local processor of the NIC 532 may be capable of performing one or more of the functions of the processors 520. Additionally, or alternatively, in such embodiments, the local memory of the NIC 532 may be integrated into one or more components of the compute node at the board level, socket level, chip level, and/or other levels. In some examples, a network interface includes a network interface controller or a network interface card. In some examples, a network interface can include one or more of a network interface controller (NIC) 532, a host fabric interface (HFI), a host bus adapter (HBA), network interface connected to a bus or connection (for example, PCIe, CXL, DDR, and so forth). In some examples, a network interface can be part of a switch or a system-on-chip (SoC). The NIC 532 can communicate using a network protocol such as Ethernet (Institute of Electrical and Electronics Engineers (IEEE) 802.3 standard).

The communication circuit 530 is communicatively coupled to an optical data connector 534. The optical data connector 534 is configured to mate with a corresponding optical data connector of a rack when the compute node 500 is mounted in the rack. Illustratively, the optical data connector 534 includes a plurality of optical fibers which lead from a mating surface of the optical data connector 534 to an optical transceiver 536. The optical transceiver 536 is configured to convert incoming optical signals from the rack-side optical data connector to electrical signals and to convert electrical signals to outgoing optical signals to the rack-side optical data connector. Although shown as forming part of the optical data connector 534 in the illustrative embodiment, the optical transceiver 536 may form a portion of the communication circuit 530 or even processor 520 in other embodiments.

In some embodiments, the compute node 500 may also include an expansion connector 540. In such embodiments, the expansion connector 540 is configured to mate with a corresponding connector of an expansion circuit board substrate to provide additional physical resources to the compute node 500. The additional physical resources may be used, for example, by the processors 520 during operation of the compute node 500. The expansion circuit board substrate may be substantially similar to the circuit board substrate 302 discussed above and may include various electrical components mounted thereto. The particular electrical components mounted to the expansion circuit board substrate may depend on the intended functionality of the expansion circuit board substrate. For example, the expansion circuit board substrate may provide additional compute resources, memory resources, and/or storage resources. As such, the additional physical resources of the expansion circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits.

Figure 6:
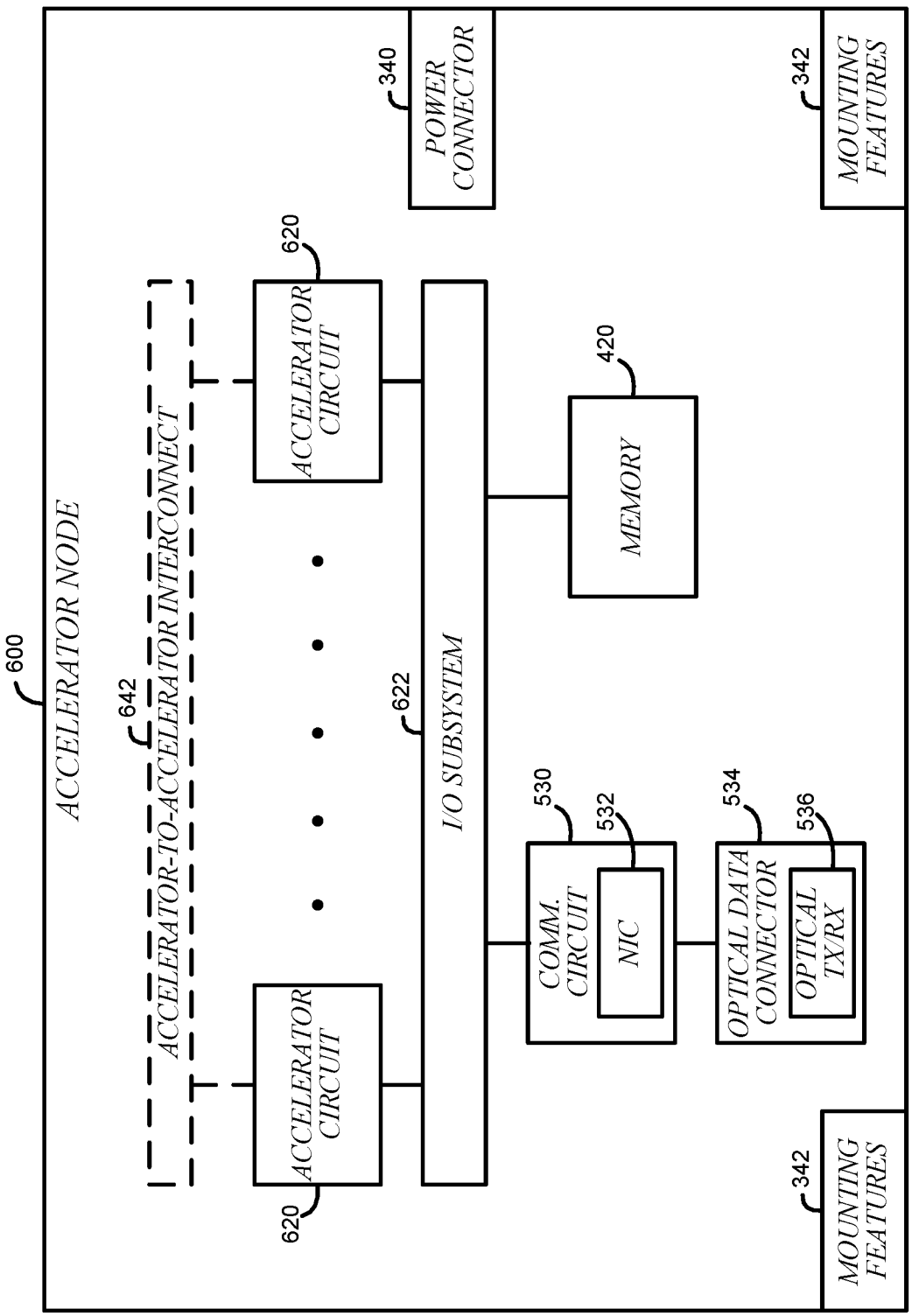
FIG. 6 is a simplified block diagram of at least one embodiment of an accelerator node usable in a data center.

Referring now to FIG. 6, in some embodiments, the node 300 may be embodied as an accelerator node 600. The accelerator node 600 is configured to perform specialized compute tasks, such as machine learning, encryption, hashing, or another computational-intensive task. In some embodiments, for example, a compute node 500 may offload tasks to the accelerator node 600 during operation. The accelerator node 600 includes various components similar to components of the node 300 and/or compute node 500, which have been identified in FIG. 6 using the same reference numbers.

In the illustrative accelerator node 600, the physical resources 320 are embodied as accelerator circuits 620. Although only two accelerator circuits 620 are shown in FIG. 6, it should be appreciated that the accelerator node 600 may include additional accelerator circuits 620 in other embodiments. The accelerator circuits 620 may be embodied as any type of processor, co-processor, compute circuit, or other device capable of performing compute or processing operations. For example, the accelerator circuits 620 may be embodied as, for example, central processing units, cores, field programmable gate arrays (FPGA), application-specific integrated circuits (ASICs), programmable control logic (PCL), security co-processors, graphics processing units (GPUs), neuromorphic processor units, quantum computers, machine learning circuits, or other specialized processors, controllers, devices, and/or circuits.

In some embodiments, the accelerator node 600 may also include an accelerator-to-accelerator interconnect 642. Similar to the resource-to-resource interconnect 324 of the node 300 discussed above, the accelerator-to-accelerator interconnect 642 may be embodied as any type of communication interconnect capable of facilitating accelerator-to-accelerator communications. In the illustrative embodiment, the accelerator-to-accelerator interconnect 642 is embodied as a high-speed point-to-point interconnect (for example, faster than the I/O subsystem 622). For example, the accelerator-to-accelerator interconnect 642 may be embodied as a QuickPath Interconnect (QPI), an UltraPath Interconnect (UPI), or other high-speed point-to-point interconnect dedicated to processor-to-processor communications. In some embodiments, the accelerator circuits 620 may be daisy-chained with a primary accelerator circuit 620 connected to the MC 532 and memory 420 through the I/O subsystem 622 and a secondary accelerator circuit 620 connected to the NIC 532 and memory 420 through a primary accelerator circuit 620.

Figure 7:
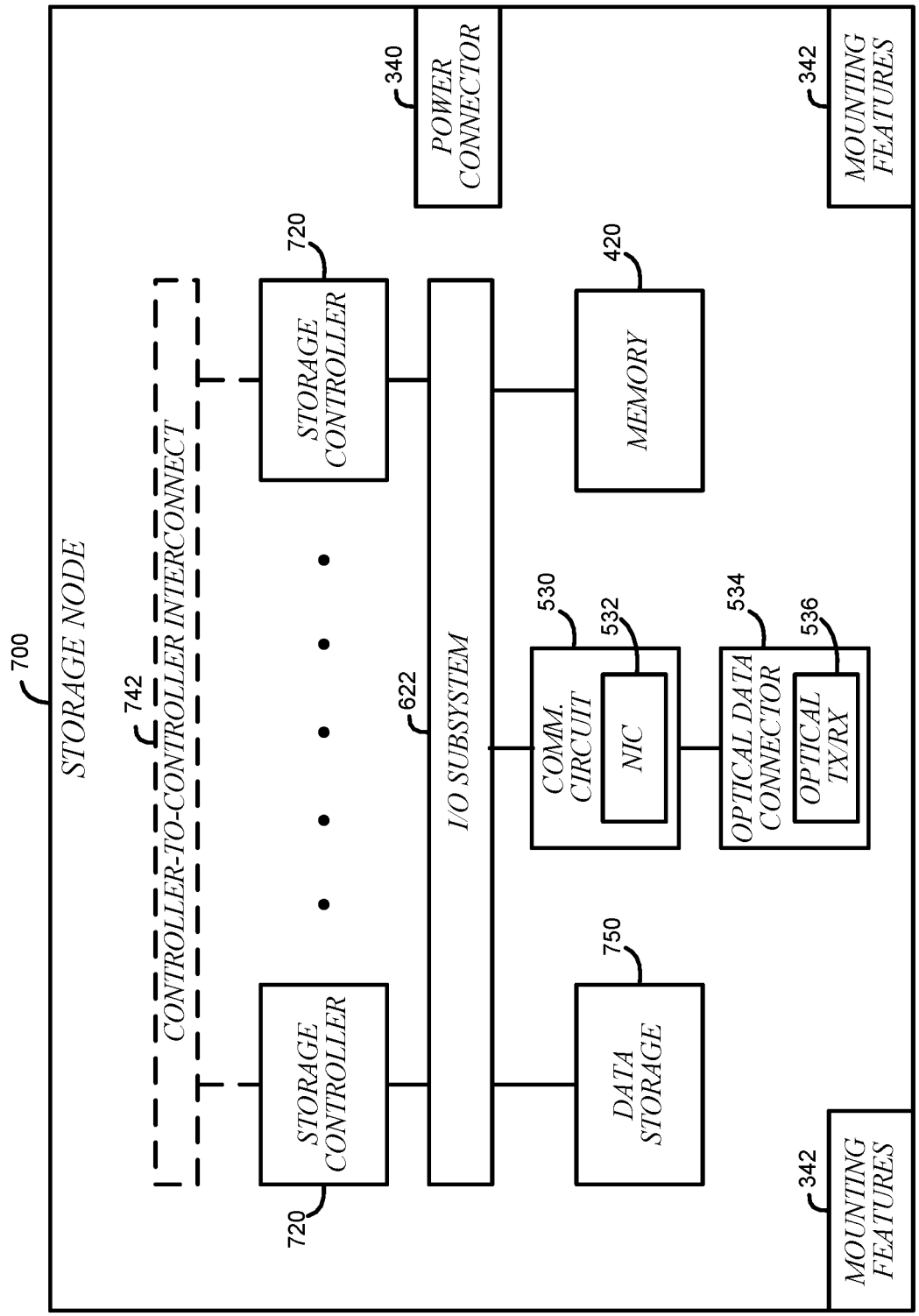
FIG. 7 is a simplified block diagram of at least one embodiment of a storage node usable in a data center.

Referring now to FIG. 7, in some embodiments, the node 300 may be embodied as a storage node 700. The storage node 700 is configured to store data in a data storage 750 local to the storage node 700. For example, during operation, a compute node 500 or an accelerator node 600 may store and retrieve data from the data storage 750 of the storage node 700. The storage node 700 includes various components similar to components of the node 300 and/or the compute node 500, which have been identified in FIG. 7 using the same reference numbers.

In the illustrative storage node 700, the physical resources 320 are embodied as storage controllers 720. Although only two storage controllers 720 are shown in FIG. 7, it should be appreciated that the storage node 700 may include additional storage controllers 720 in other embodiments. The storage controllers 720 may be embodied as any type of processor, controller, or control circuit capable of controlling the storage and retrieval of data into the data storage 750 based on requests received via the communication circuit 530. In the illustrative embodiment, the storage controllers 720 are embodied as relatively low-power processors or controllers. For example, in some embodiments, the storage controllers 720 may be configured to operate at a power rating of about 75 watts.

In some embodiments, the storage node 700 may also include a controller-to-controller interconnect 742. Similar to the resource-to-resource interconnect 324 of the node 300 discussed above, the controller-to-controller interconnect 742 may be embodied as any type of communication interconnect capable of facilitating controller-to-controller communications. In the illustrative embodiment, the controller-to-controller interconnect 742 is embodied as a high-speed point-to-point interconnect (for example, faster than the I/O subsystem 622). For example, the controller-to-controller interconnect 742 may be embodied as a QuickPath Interconnect (QPI), an UltraPath Interconnect (UPI), or other high-speed point-to-point interconnect dedicated to processor-to-processor communications.

Figure 8:
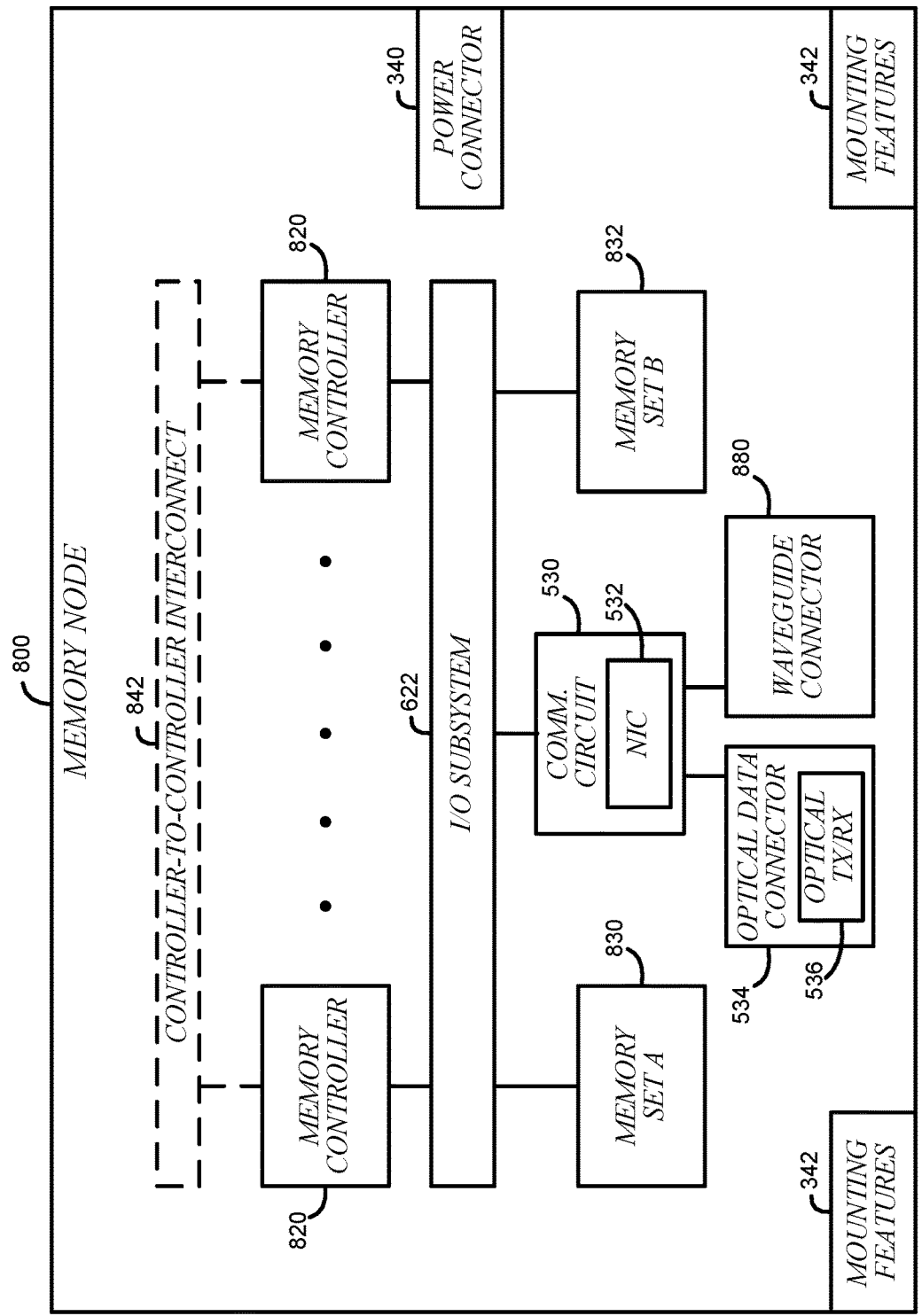
FIG. 8 is a simplified block diagram of at least one embodiment of a memory node usable in a data center.

Referring now to FIG. 8, in some embodiments, the node 300 may be embodied as a memory node 800. The memory node 800 is configured to provide other nodes 300 (for example, compute nodes 500, accelerator nodes 600, etc.) with access to a pool of memory (for example, in two or more sets 830, 832 of memory devices 420) local to the storage node 700. For example, during operation, a compute node 500 or an accelerator node 600 may remotely write to and/or read from one or more of the memory sets 830, 832 of the memory node 800 using a logical address space that maps to physical addresses in the memory sets 830, 832.

In the illustrative memory node 800, the physical resources 320 are embodied as memory controllers 820. Although only two memory controllers 820 are shown in FIG. 8, it should be appreciated that the memory node 800 may include additional memory controllers 820 in other embodiments. The memory controllers 820 may be embodied as any type of processor, controller, or control circuit capable of controlling the writing and reading of data into the memory sets 830, 832 based on requests received via the communication circuit 530. In the illustrative embodiment, each memory controller 820 is connected to a corresponding memory set 830, 832 to write to and read from memory devices 420 within the corresponding memory set 830, 832 and enforce any permissions (for example, read, write, etc.) associated with node 300 that has sent a request to the memory node 800 to perform a memory access operation (for example, read or write).

In some embodiments, the memory node 800 may also include a controller-to-controller interconnect 842. Similar to the resource-to-resource interconnect 324 of the node 300 discussed above, the controller-to-controller interconnect 842 may be embodied as any type of communication interconnect capable of facilitating controller-to-controller communications. In the illustrative embodiment, the controller-to-controller interconnect 842 is embodied as a high-speed point-to-point interconnect (for example, faster than the I/O subsystem 622). For example, the controller-to-controller interconnect 842 may be embodied as a QuickPath Interconnect (QPI), an UltraPath Interconnect (UPI), or other high-speed point-to-point interconnect dedicated to processor-to-processor communications. As such, in some embodiments, a memory controller 820 may access, through the controller-to-controller interconnect 842, memory that is within the memory set 832 associated with another memory controller 820. In some embodiments, a scalable memory controller is made of multiple smaller memory controllers, referred to herein as "chiplets", on a memory node (for example, the memory node 800). The chiplets may be interconnected (for example, using EMIB (Embedded Multi-Die Interconnect Bridge)). The combined chiplet memory controller may scale up to a relatively large number of memory controllers and I/O ports, (for example, up to 16 memory channels). In some embodiments, the memory controllers 820 may implement a memory interleave (for example, one memory address is mapped to the memory set 830, the next memory address is mapped to the memory set 832, and the third address is mapped to the memory set 830, etc.). The interleaving may be managed within the memory controllers 820, or from CPU sockets (for example, of the compute node 500) across network links to the memory sets 830, 832, and may improve the latency associated with performing memory access operations as compared to accessing contiguous memory addresses from the same memory device.

Further, in some embodiments, the memory node 800 may be connected to one or more other nodes 300 (for example, in the same rack 240 or an adjacent rack 240) through a waveguide, using the waveguide connector 880. In the illustrative embodiment, the waveguides are 64 millimeter waveguides that provide 16 Rx (for example, receive) lanes and 16 Tx (for example, transmit) lanes. Each lane, in the illustrative embodiment, is either 16 GHz or 32 GHz. In other embodiments, the frequencies may be different. Using a waveguide may provide high throughput access to the memory pool (for example, the memory sets 830, 832) to another node (for example, a node 300 in the same rack 240 or an adjacent rack 240 as the memory node 800) without adding to the load on the optical data connector 534.

Figure 9:
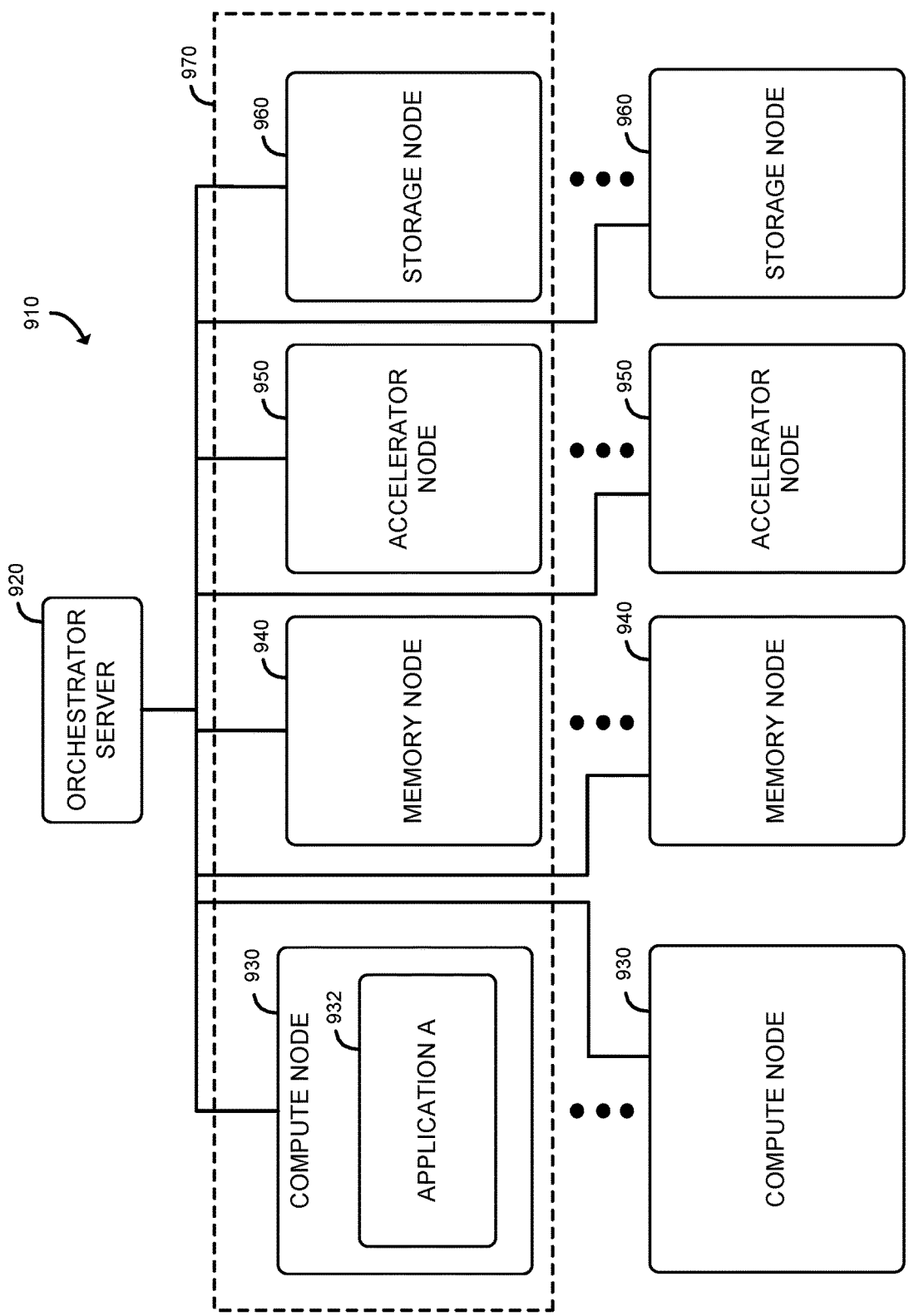
FIG. 9 depicts a system for executing one or more workloads.

Referring now to FIG. 9, a system 910 for executing one or more workloads (for example, applications) may be implemented. In the illustrative embodiment, the system 910 includes an orchestrator server 920, which may be embodied as a managed node comprising a compute device (for example, a processor 520 on a compute node 500) executing management software (for example, a cloud operating environment, such as OpenStack) that is communicatively coupled to multiple nodes 300 including a large number of compute nodes 930 (for example, each similar to the compute node 500), memory nodes 940 (for example, each similar to the memory node 800), accelerator nodes 950 (for example, each similar to the accelerator node 600), and storage nodes 960 (for example, each similar to the storage node 700). One or more of the nodes 930, 940, 950, 960 may be grouped into a managed node 970, such as by the orchestrator server 920, to collectively perform a workload (for example, an application 932 executed in a virtual machine or in a container).

The managed node 970 may be embodied as an assembly of physical resources 320, such as processors 520, memory resources 420, accelerator circuits 620, or data storage 750, from the same or different nodes 300. Physical resources 320 from the same compute node 500 or the same memory node 800 or the same accelerator node 600 or the same storage node 700 can be assigned to a single managed node 970. Alternatively, physical resources 320 from the same node 300 can be assigned to different managed nodes 970. Further, the managed node may be established, defined, or "spun up" by the orchestrator server 920 at the time a workload is to be assigned to the managed node or at any other time, and may exist regardless of whether any workloads are presently assigned to the managed node. In the illustrative embodiment, the orchestrator server 920 may selectively allocate and/or deallocate physical resources 320 from the nodes 300 and/or add or remove one or more nodes 300 from the managed node 970 as a function of quality of service (QoS) targets (for example, a target throughput, a target latency, a target number of instructions per second, etc.) associated with a service level agreement for the workload (for example, the application 932). In doing so, the orchestrator server 920 may receive telemetry data indicative of performance conditions (for example, throughput, latency, instructions per second, etc.) in each node 300 of the managed node 970 and compare the telemetry data to the quality of service targets to determine whether the quality of service targets are being satisfied. The orchestrator server 920 may additionally determine whether one or more physical resources may be deallocated from the managed node 970 while still satisfying the QoS targets, thereby freeing up those physical resources for use in another managed node (for example, to execute a different workload). Alternatively, if the QoS targets are not presently satisfied, the orchestrator server 920 may determine to dynamically allocate additional physical resources to assist in the execution of the workload (for example, the application 932) while the workload is executing. Similarly, the orchestrator server 920 may determine to dynamically deallocate physical resources from a managed node if the orchestrator server 920 determines that deallocating the physical resource would result in QoS targets still being met.

Additionally, in some embodiments, the orchestrator server 920 may identify trends in the resource utilization of the workload (for example, the application 932), such as by identifying phases of execution (for example, time periods in which different operations, each having different resource utilizations characteristics, are performed) of the workload (for example, the application 932) and pre-emptively identifying available resources in the data center and allocating them to the managed node 970 (for example, within a predefined time period of the associated phase beginning). In some embodiments, the orchestrator server 920 may model performance based on various latencies and a distribution scheme to place workloads among compute nodes and other resources (for example, accelerator nodes, memory nodes, storage nodes) in the data center. For example, the orchestrator server 920 may utilize a model that accounts for the performance of resources on the nodes 300 (for example, FPGA performance, memory access latency, etc.) and the performance (for example, congestion, latency, bandwidth) of the path through the network to the resource (for example, FPGA). As such, the orchestrator server 920 may determine which resource(s) should be used with which workloads based on the total latency associated with each potential resource available in the data center 100 (for example, the latency associated with the performance of the resource itself in addition to the latency associated with the path through the network between the compute node executing the workload and the node 300 on which the resource is located).

In some embodiments, the orchestrator server 920 may generate a map of heat generation in the data center 100 using telemetry data (for example, temperatures, fan speeds, etc.) reported from the nodes 300 and allocate resources to managed nodes as a function of the map of heat generation and predicted heat generation associated with different workloads, to maintain a target temperature and heat distribution in the data center 100. Additionally or alternatively, in some embodiments, the orchestrator server 920 may organize received telemetry data into a hierarchical model that is indicative of a relationship between the managed nodes (for example, a spatial relationship such as the physical locations of the resources of the managed nodes within the data center 100 and/or a functional relationship, such as groupings of the managed nodes by the users the managed nodes provide services for, the types of functions typically performed by the managed nodes, managed nodes that typically share or exchange workloads among each other, etc.). Based on differences in the physical locations and resources in the managed nodes, a given workload may exhibit different resource utilizations (for example, cause a different internal temperature, use a different percentage of processor or memory capacity) across the resources of different managed nodes. The orchestrator server 920 may determine the differences based on the telemetry data stored in the hierarchical model and factor the differences into a prediction of future resource utilization of a workload if the workload is reassigned from one managed node to another managed node, to accurately balance resource utilization in the data center 100. In some embodiments, the orchestrator server 920 may identify patterns in resource utilization phases of the workloads and use the patterns to predict future resource utilization of the workloads.

To reduce the computational load on the orchestrator server 920 and the data transfer load on the network, in some embodiments, the orchestrator server 920 may send self-test information to the nodes 300 to enable each node 300 to locally (for example, on the node 300) determine whether telemetry data generated by the node 300 satisfies one or more conditions (for example, an available capacity that satisfies a predefined threshold, a temperature that satisfies a predefined threshold, etc.). Each node 300 may then report back a simplified result (for example, yes or no) to the orchestrator server 920, which the orchestrator server 920 may utilize in determining the allocation of resources to managed nodes.

Figure 10:
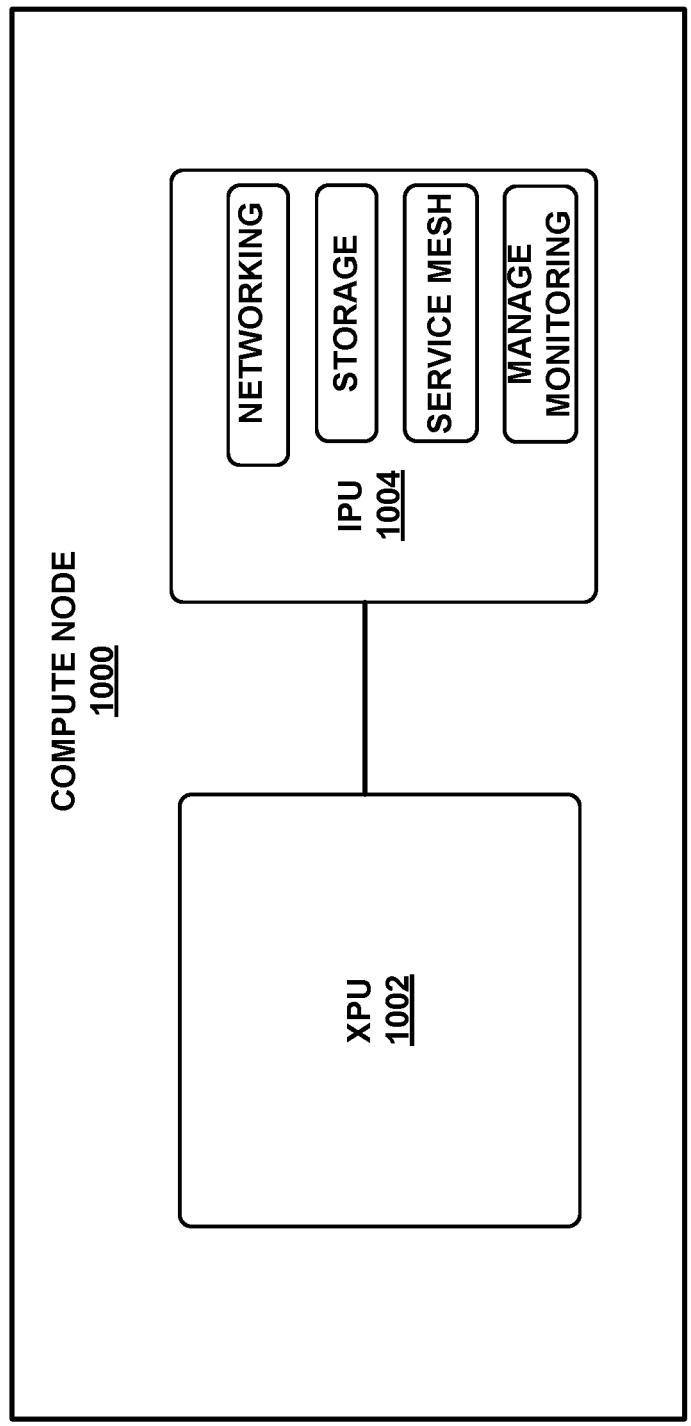
FIG. 10 illustrates a compute node that includes an Infrastructure Processing Unit (IPU) and an xPU.

FIG. 10 illustrates a compute node 1000 that includes an Infrastructure Processing Unit (IPU) 1004 and an xPU 1002. An XPU or xPU can refer to a Central processing unit (CPU), graphics processing unit (GPU), general purpose GPU (GPGPU), field programmable gate array (FPGA), Accelerated Processing Unit (APU), Artificial Intelligence processing Unit (AIPU), an Image/Video Processing Unit (VPU), accelerator or another processor. These can also include functions such as quality of service enforcement, tracing, performance and error monitoring, logging, authentication, service mesh, data transformation, etc.

Infrastructure Processing Units (IPUs) also referred to as Data Processing Units (DPUs) can be used by CSPs for performance, management, security and coordination functions in addition to infrastructure offload and communications. For example, IPUs can be integrated with smart NICs and storage or memory (for example, on a same die, system on chip (SoC), or connected dies) that are located at on-premises systems, base stations, gateways, neighborhood central offices, and so forth.

The IPU 1004 can perform an application composed of microservices. Microservices can include a decomposition of a monolithic application into small manageable defined services. Each microservice runs in its own process and communicates using protocols (for example, a Hypertext Transfer Protocol (HTTP) resource application programming interfaces (API), message service or Google remote procedure call (gRPC) calls/messages). Microservices can be independently deployed using centralized management of these services.

The IPU 1004 can execute platform management, networking stack processing operations, security (crypto) operations, storage software, identity and key management, telemetry, logging, monitoring and service mesh (e.g., control how different microservices communicate with one another). The IPU 1004 can access the xPU 1002 to offload performance of various tasks.

Figure 11:
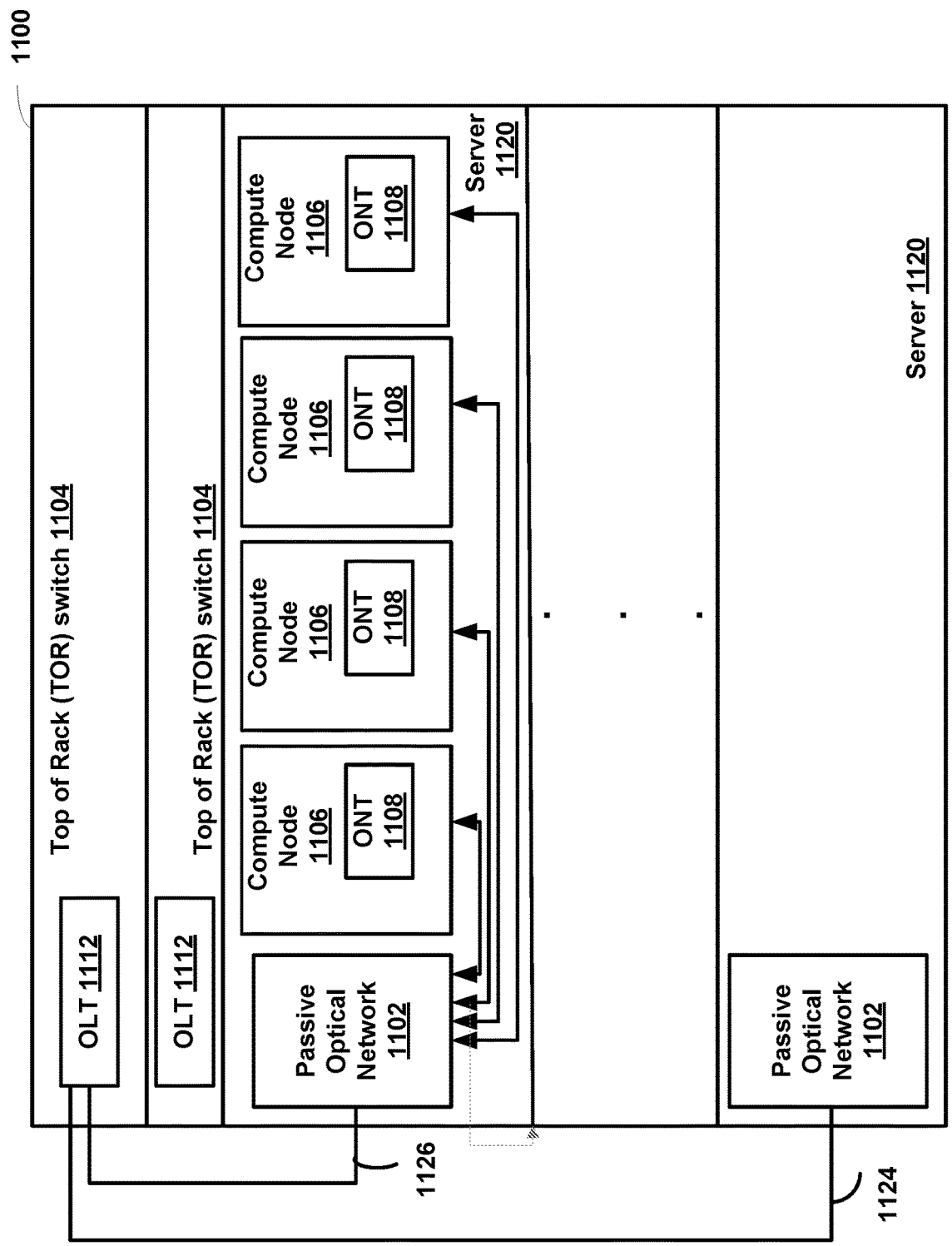
FIG. 11 illustrates a data center that includes servers and a Top of Rack (TOR) switch.

FIG. 11 illustrates a data center 1100 that includes servers 1120 and a Top of Rack switch (TOR switch) 1104. Traditional Gigabit Passive Optical Network (GPON) concepts are applied to the data center 1100 to provide a scalable and high bandwidth network solution.

The data center 1100 includes two Top of Rack (TOR) switches 1104 for redundancy. One of the ports in one of the TOR switches 1104 includes an Optical Line Terminal (OLT) 1112. A received electrical signal is converted into an optical signal by the OLT 1112. The optical signal is transmitted through an optical fiber. The other TOR switch 1104 is a redundant TOR switch 1104 that also includes an Optical Line Terminal (OLT) 1112. The OLT 1112 in the TOR switch 1104 is at the head of the Passive Optical Network (PON) 1102.

The data center 1100 includes a plurality of servers 1120. Each server 1120 can include one or more compute nodes 1106. Each compute node 1106 includes an Optical Network Terminal (ONT) 1108. An optical signal is converted into an electrical signal by the ONT 1108. The ONT 1108 receives and transmits Ethernet frames over the PON 1102. Replacing a Network Interface Controller (NIC) circuit board with the smaller PON 1102 in the server 1120 reduces the area used by components in the server 1120.

The TOR switch 1104 has multiple switch ports. In the embodiment shown in FIG. 11, optical fiber 1126 is connected to one switch port and optical fiber 1124 is connected to another switch port. Each switch port on the TOR switch 1104 can send Ethernet frames on a point to multipoint optical signal over the optical fiber 1126, 1124 via the PON 1102 to an ONT 1108 in a compute node 1106. Optical fiber 1126 connects the OLT 1112 in the TOR switch 1104 to the PON 1102 in the server 1120.

In an embodiment, each compute node 1106 only receives Ethernet frames that are sent by the TOR switch 1104 to the compute node based on a direct connection between the switch port and the compute node 1106. For example, a 400 Gigabits per second (Gbps) optical signal can be split by a splitter in the PON 1102 into four 100 G optical signals, with each 100 G optical signal connected to an ONT 1108 in one of the compute nodes 1106.

In another embodiment, each compute node 1106 receives all Ethernet frames transmitted by the TOR switch 1104 but only accepts the Ethernet frames that include the Internet Protocol (IP) address, Media Access Control (MAC) address or other identifying bits assigned to the compute node 1106. The ONT 1108 in the compute node 1106 filters the packets for other ONTs.

PON over GPON (Gigabit Passive Optical Network) can be used in the data center 1100 to provide more scalable and high bandwidth networking solution than a traditional Local Area Network (LAN) based Network Interface Controller (NIC).

Figure 12:
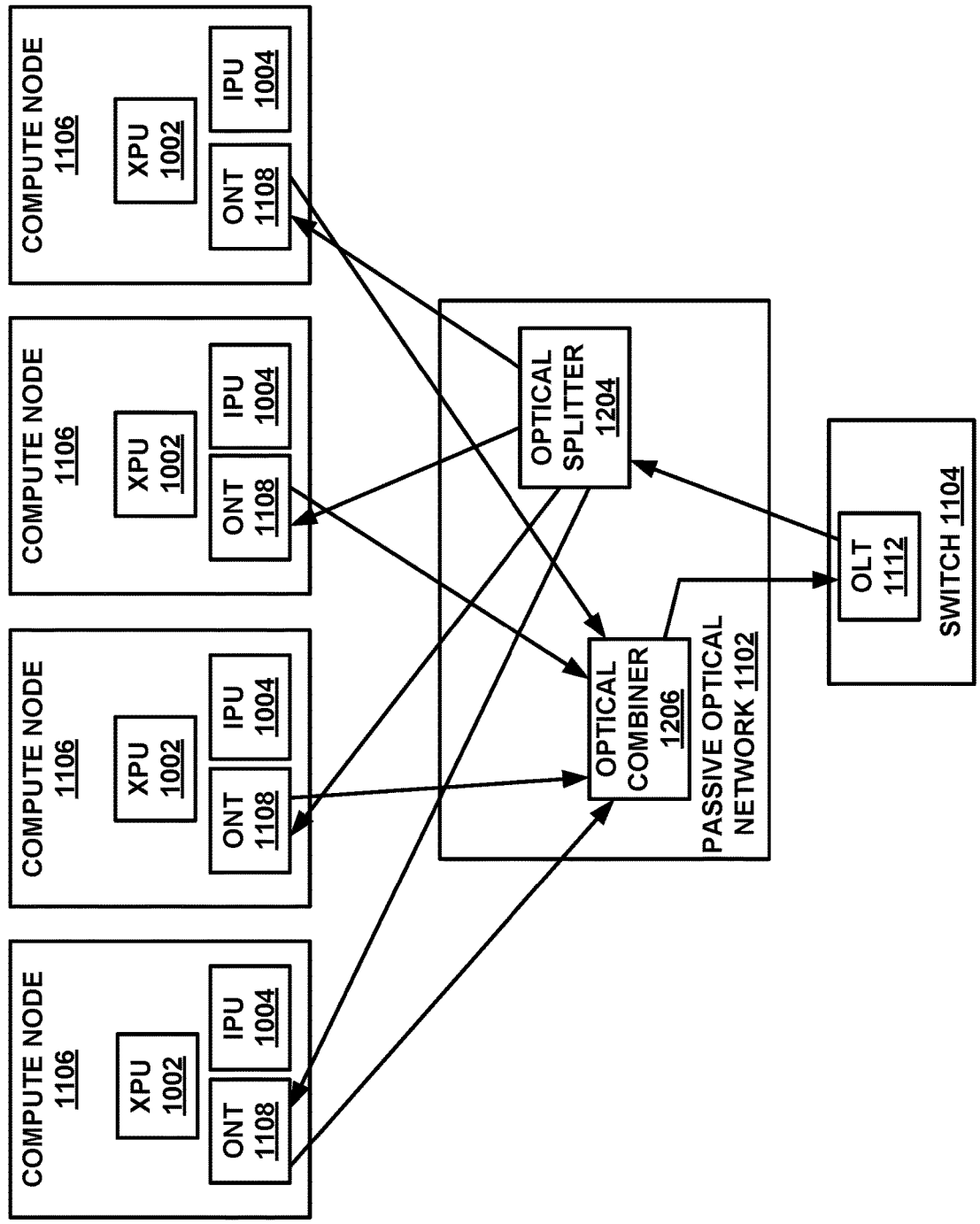
FIG. 12 is a block diagram illustrating an embodiment of the use of a passive optical network in a data center for communication between a switch and compute nodes.

FIG. 12 is a block diagram illustrating an embodiment of the use of a passive optical network 1102 in a data center 1100 for communication between a switch 1104 and compute nodes 1106. The passive optical network 1102 includes a non-powered optical splitter 1204 and a non-powered optical combiner 1206 to receive and transmit Ethernet frames that are compatible with the Institute of Electrical and Electronics Engineers (IEEE) Ethernet PON standards 802.3ah and IEEE 802.3av and ITU Telecommunications Standardization Sector (ITU-T) G. 984, commonly known as GPON (gigabit-capable passive optical network) and 10G-PON (also known as XG-PON or G.987).

In the embodiment shown, the XPU 1002, IPU 1004 and ONT 1108 are separate components in the compute node. In other embodiments, the ONT 1108 can be included in the IPU 1004 or the XPU 1002 or the XPU 1002, IPU 1004 and ONT 1108 can be included in one System-on-Chip (SoC) component, in an Application Specific Integrated Circuit (ASIC) or chiplets in a chip. The IPU 1004 and ONT 1108 can operate in parallel or in tandem. The XPU 1002 can have a direct path through the ONT 1108 for very low latency, or a path to the ONT 1108 through the IPU 1004.

The optical splitter 1204 splits the wavelengths received from the OLT 1112 in the switch 1104. For example, for a 400G optical signal with four 100G wavelengths, the OLT 1112 transmits and receives all four wavelengths and processes them separately and in parallel, one wavelength is transmitted to each ONT 1108, and one wavelength is received from each ONT 1108.

The optical combiner 1206 combines data received from ONTs 1108 in compute nodes 1106 by combining the wavelengths from the separate received signals into one signal.

A port in the switch 1104 includes the Optical Line Terminal (OLT) 1112. Each compute node 1106 includes the Optical Network Terminal (ONT) 1108. The single port in the switch 1104 that includes the OLT 1112 communicates via the PON 1102 with the ONTs 1108 in multiple compute nodes 1106. The PON 1102 is a shared network, that is, shared between the OLT 1112 in the switch 1104 and the multiple ONTs 1108.

The OLT 1112 is placed at the head of the network. A single fiber cable is connected from the OLT 1112 to the non-powered PON 1102. The OLT 1112 sends a single stream of downstream traffic that is transmitted to all ONTs. The optical splitter 1204 in the PON 1102 splits the received optical signal and broadcasts the optical signal over fiber cables to the connected ONTs 1108.

Each ONT 1108 reads the content of the Ethernet packets that are addressed to the ONT based on the IP address included in the Ethernet packet that is assigned to the ONT 1108. As the optical splitter 1204 in the PON 1102 does not include a buffer, a multiplexing scheme (for example, wavelength-division multiplexing or time-division multiplexing) is used to prevent collision of signals.

In an embodiment, the signal received by the optical splitter 1204 from the OLT 1112 in the switch 1104 is 400 G which includes four wavelengths of 100 G, also referred to as four separate lanes of 100 G. The optical splitter 1204 splits the 400 G signal into four separate wavelengths of 100 G (four lanes of 100 G). Each compute node 1106 receives and transmits a 100 G signal. The optical combiner 1206 combines the 100 G signal received from the ONT 1108 in each compute node 1106 into a 400 G signal that is transmitted to the OLT 1112 in the switch 1104.

Figure 13:
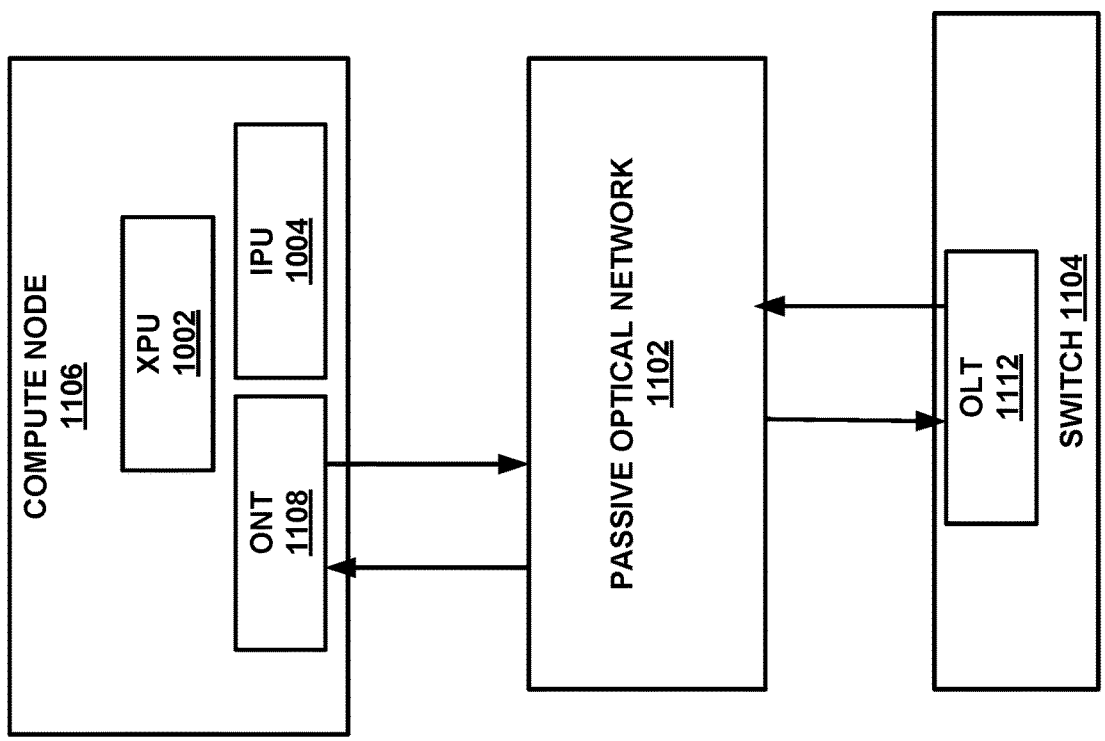
FIG. 13 is a block diagram illustrating an embodiment of a passive optical network in a data center for communication between the OLT in the switch and the ONT in a compute node in a server.

FIG. 13 is a block diagram illustrating an embodiment of a passive optical network 1102 in a data center 1100 for communication between the OLT 1112 in the switch 1104 and the ONT 1108 in a compute node 1106 in a server 1120. In an embodiment in which the OLT 1112 receives a 400 Gigabit (G) electrical signal, the 400 G electrical signal is converted to a 400 G optical signal and transmitted via the passive optical network to the ONT 1108 in the compute node 1106 in the server 1120. A 400 G optical signal transmitted from the ONT 1108 in the compute node 1106 in the server 1120 is received by the OLT 1112 in the switch 1104 via the PON 1102.

Figure 14A:
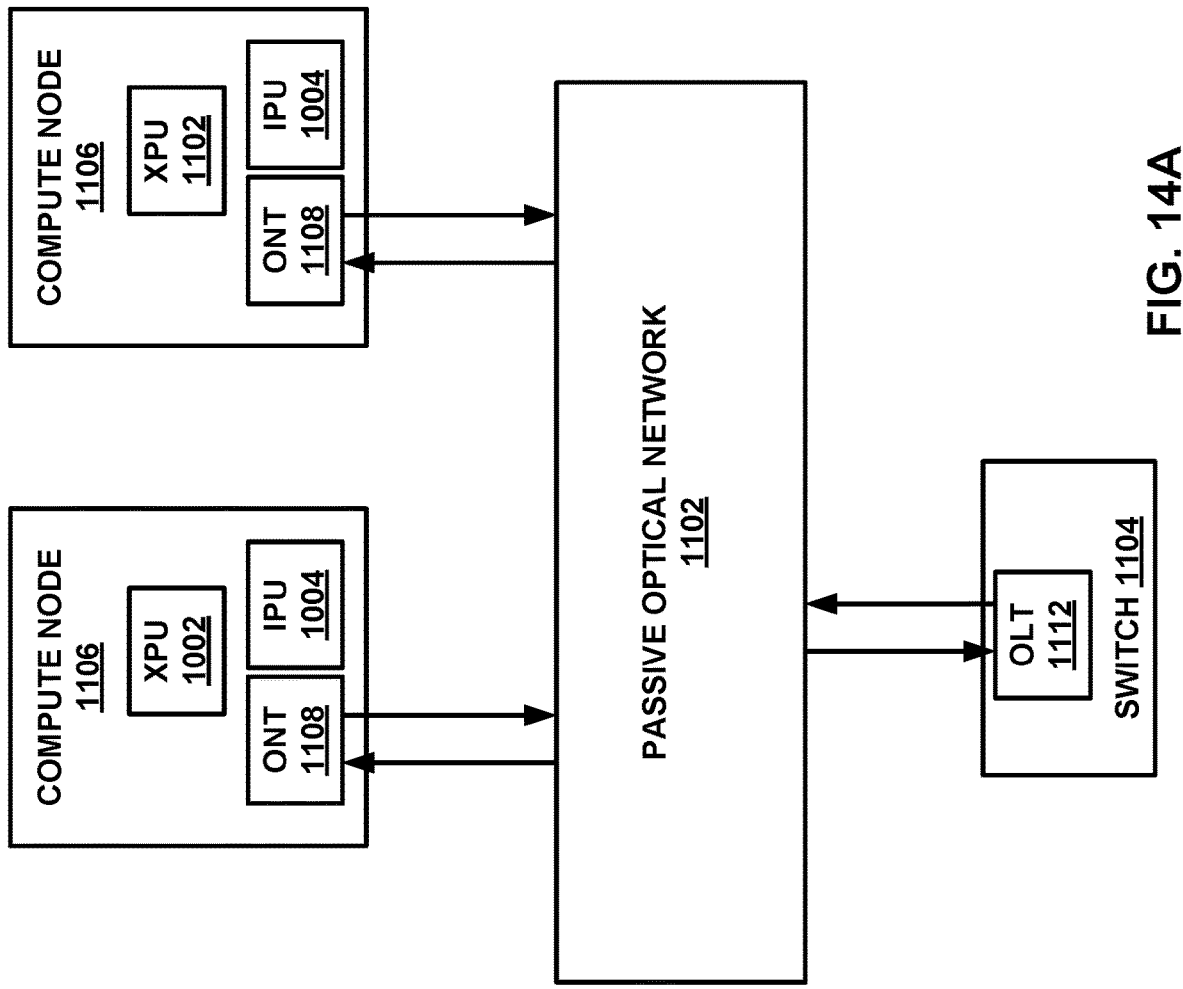
FIG. 14A is a block diagram illustrating another embodiment of a passive optical network in a data center for communication between an OLT in a switch and an ONT in a compute node in a server.

FIG. 14A is a block diagram illustrating another embodiment of a passive optical network 1102 in a data center 1100 for communication between an OLT 1112 in a switch 1104 and an ONT 1108 in a compute node 1106 in a server 1120. The switch 1104 includes an OLT 1112 that can transmit and receive a 400 G optical signal over two 200 G lanes.

There are two compute nodes 1106 and one switch 1104 communicatively coupled via the PON 1102. Each compute node 1106 receives one of the two 200G lanes via the optical splitter 1204 in the PON 1102. The 200 G lanes can be assigned to each compute node 1106 based on physical location by the server 1120 or the switch 1104. The optical combiner 1206 in the PON 1102 combines the two received 200 G lanes that are forwarded as a 400 G optical signal to the OLT 1112 in the switch.

Figure 14B:
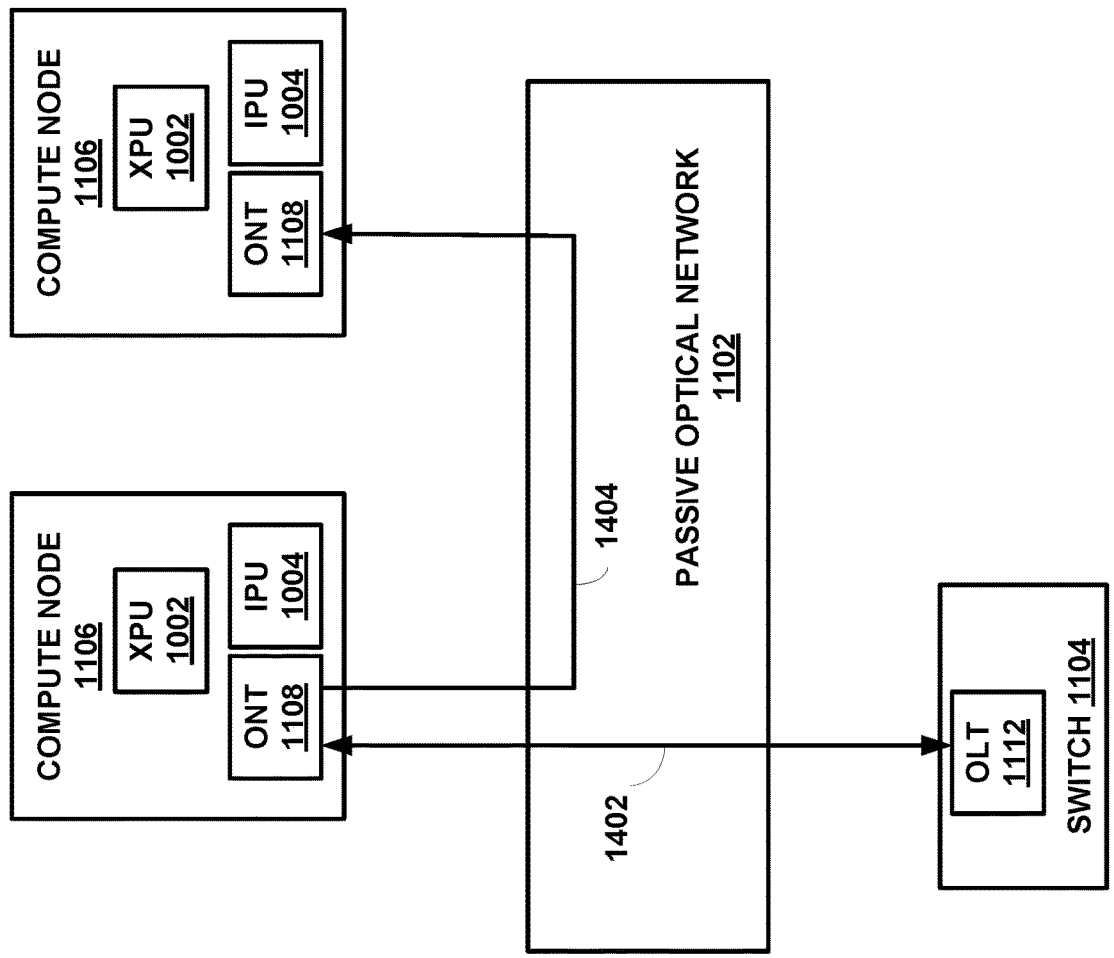
FIG. 14B is a block diagram illustrating communication between an OLT in a switch and an ONT in the compute node shown in FIG. 14A.

FIG. 14B is a block diagram illustrating communication between an OLT 1112 in a switch 1104 and an ONT 1108 in the compute node 1106 shown in FIG. 14A. The switch 1104 includes the OLT 1112 that can transmit and receive 400 G over two 200 G lanes. The PON 1102 has multiple optical paths between the OLT 1112 in the switch 1104 and the ONT 1108 in the compute node 1106. In the embodiment shown in FIG. 14B, there are two compute nodes 1106 and one switch 1104. A first optical path 1402 in the PON 1102 is used to transmit a 400 G optical signal from the OLT 1112 in the switch 1104 to one of the compute nodes 1106, a second optical path 1404 is used to transmit a 200 G optical signal from one of the compute nodes 1106 to another one of the compute nodes 1106. The second optical path 1404 allows communication between the two compute nodes 1106 and removes latency of the switch in communication between the two compute nodes 1106.

FIGS. 15A-15E illustrate another embodiment of a PON 1102 in a server 1120 in a data center 1100 for communication between an OLT 1112 in a switch 1104 and an ONT 1108 in a compute node 1106 in a server 1120. In the embodiment shown, there are four compute nodes 1106 and one switch 1104. The switch 1104 has a 400 G optical port with four 100 G optical signals, each of the four 100 G optical signals is an independent optical stream that is communicatively coupled with a different compute node 1106 via the optical splitter 1204 in the PON 1102.

Figure 15A:
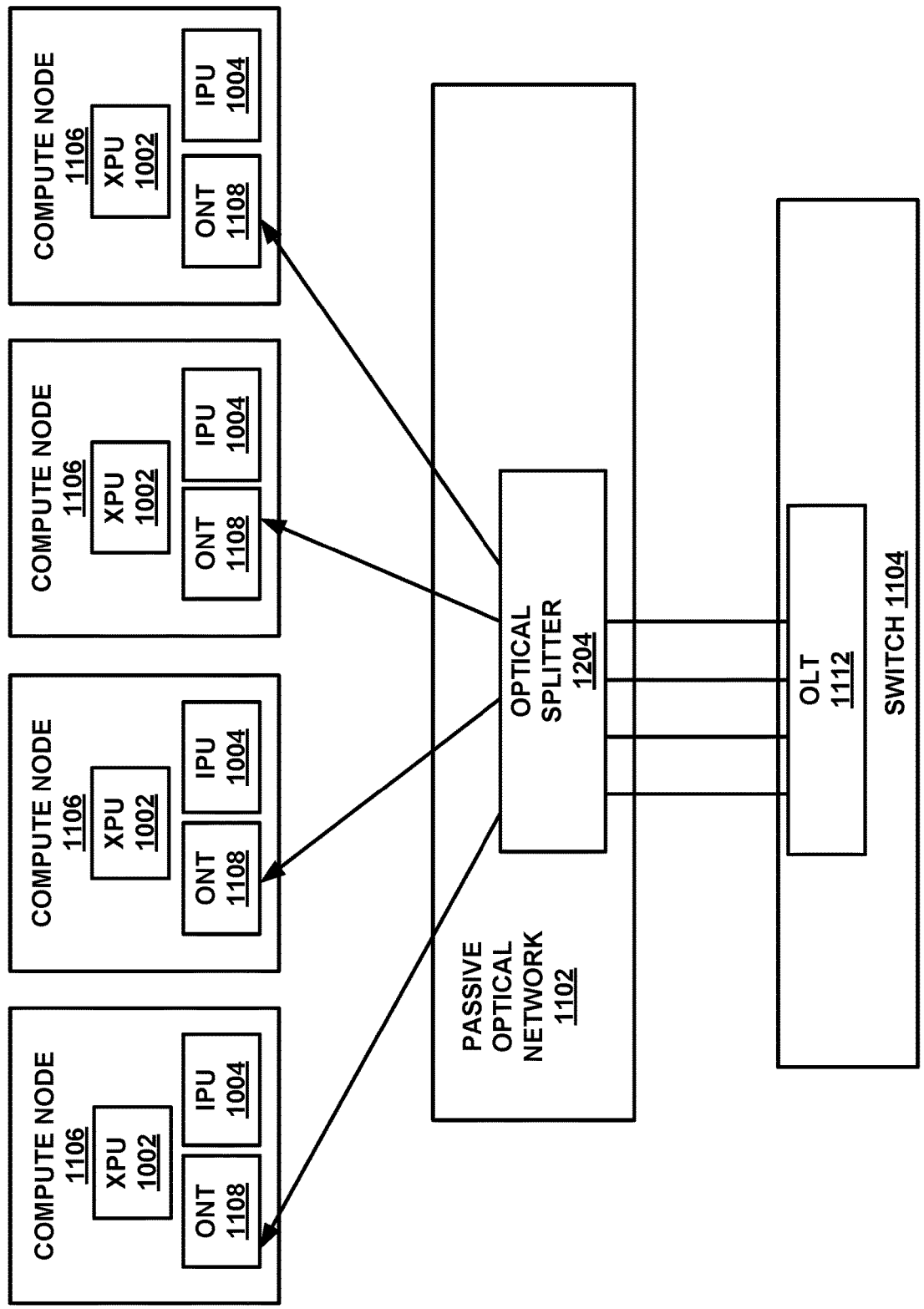
FIG. 15A illustrates the paths through the optical splitter in the PON to transmit each of the four independent optical streams from the OLT in the switch.

FIG. 15A illustrates the paths through the optical splitter 1204 in the PON 1102 to transmit each of the four independent optical streams from the OLT 1112 in the switch 1104. One of the four independent optical streams is transmitted to one of the ONTs 1108 in one of the compute nodes 1106.

The path between the OLT 1112 in the switch 1104 and the optical splitter 1204 in the PON 1102 has 4 connections. Each of the 4 connections can represent one of 4 different wavelengths with each of the four wavelengths sent to one ONT 1108. The connection between the OLT 1112 and the optical splitter 1204 can be a single fiber optics cable or four independent fiber optics cables.

Figure 15B:
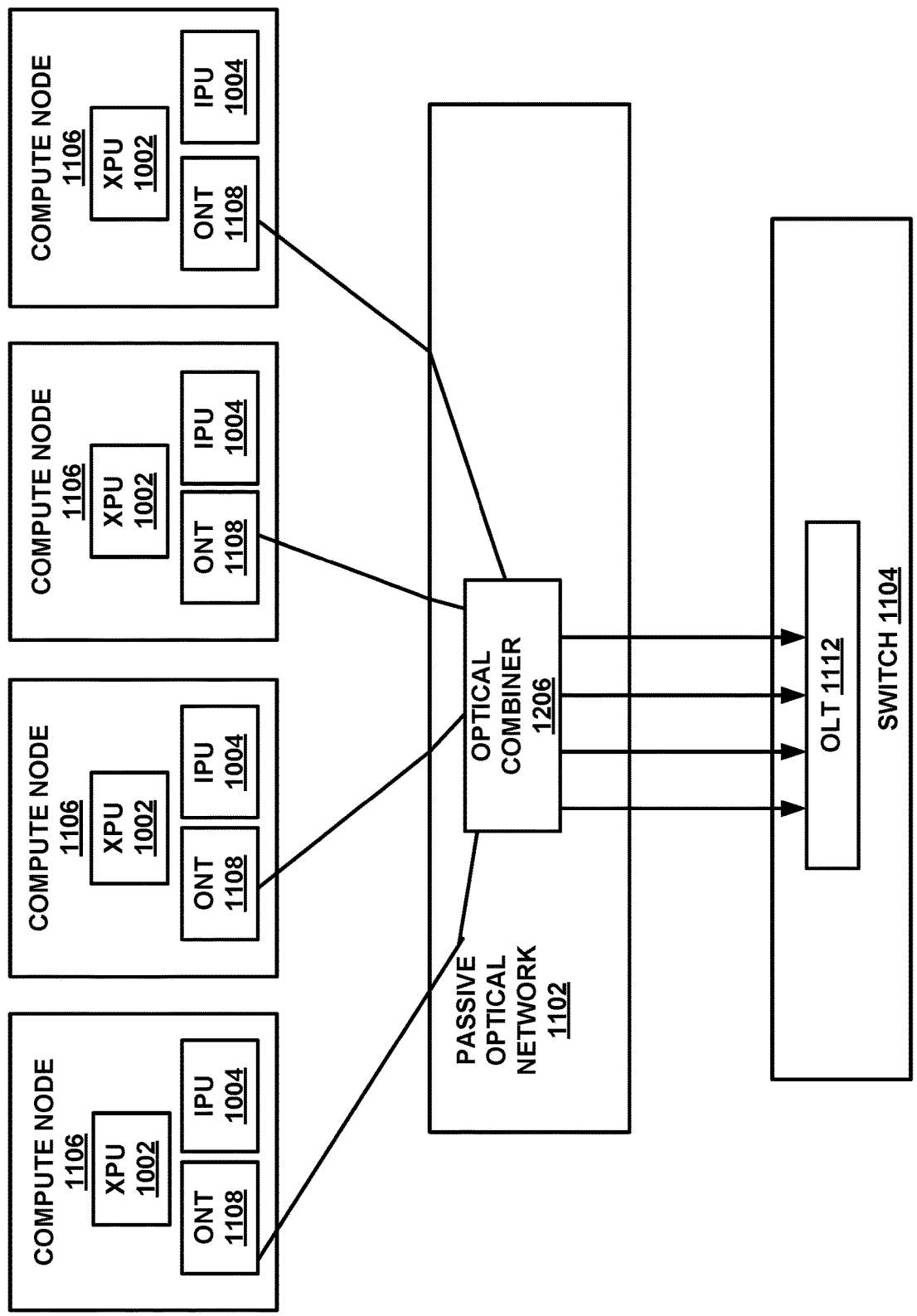
FIG. 15B illustrates the four paths through the optical combiner in the PON to transmit each of the four independent streams from each of the compute nodes to the OLT in the switch.

FIG. 15B illustrates the four paths through the optical combiner 1206 in the PON 1102 to transmit each of the four independent streams from each of the compute nodes 1106 to the OLT 1112 in the switch 1104. The optical combiner 1206 combines the four independent optical streams received from each of the compute nodes 1106. The switch receives the four 100 G optical streams on a single 400G port.

Figure 15C:
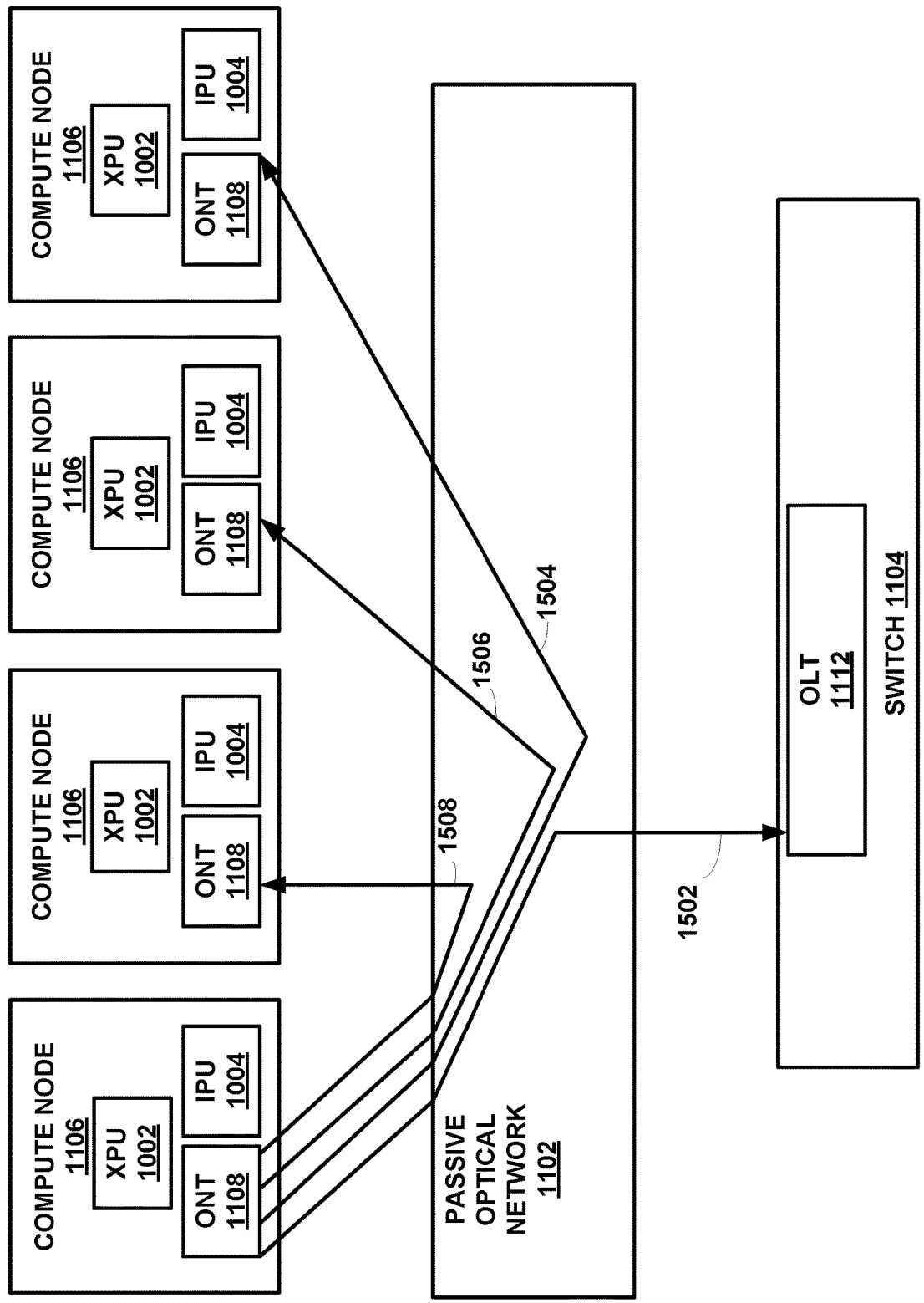
FIG. 15C illustrates optical signal paths from one of the compute nodes through the PON to transmit data to the other compute nodes in the server and to transmit data to the OLT in the switch.

FIG. 15C illustrates optical signal paths from one of the compute nodes 1106 through the PON 1102 to transmit data to the other compute nodes 1106 in the server 1120 and to transmit data to the OLT 1112 in the switch 1104. The 100 G optical signal from the compute node 1106 is transmitted on optical path 1502 via the PON 1102 to the OLT 1112 in the switch 1104. The other 100 G optical signals from the compute node 1106 are transmitted on separate optical paths 1504, 1506, 1508 to each of the other compute nodes 1106.

Figure 15D:
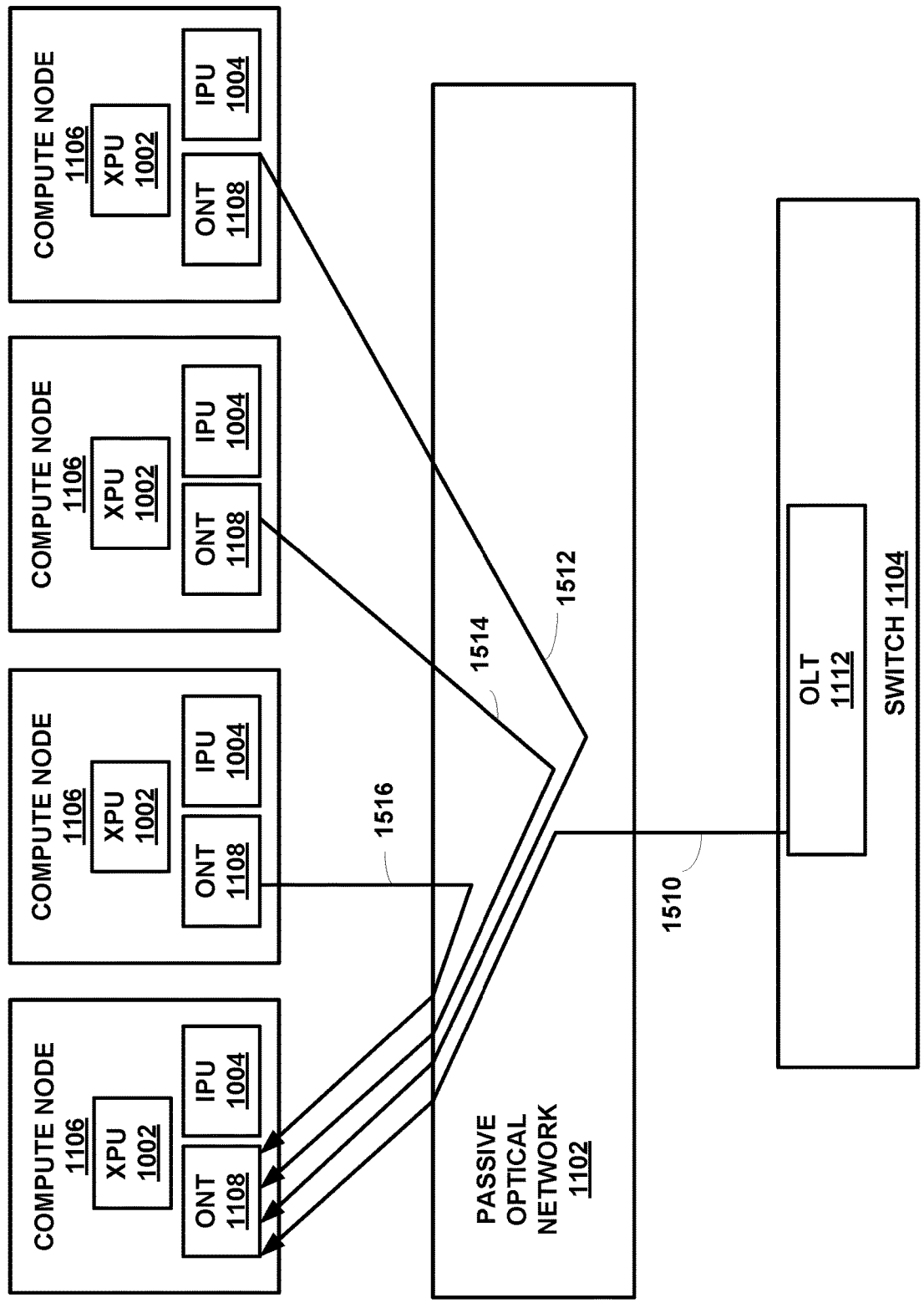
FIG. 15D illustrates optical signal paths from one of the compute nodes through the PON to receive data from the other compute nodes and to receive data from the OLT in the switch.

FIG. 15D illustrates optical signal paths from one of the compute nodes 1106 through the PON 1102 to receive data from the other compute nodes 1106 and to receive data from the OLT 1112 in the switch 1104. The 100 G optical signal is received by the compute node on optical signal path 1510 via the PON 1102 from the OLT 1112 in the switch 1104. The other three 100 G optical signals are transmitted by the compute node 1106 via the PON 1102 on separate optical signal paths 1512, 1514, 1516 to each of the other three compute nodes 1106.

Figure 15E:
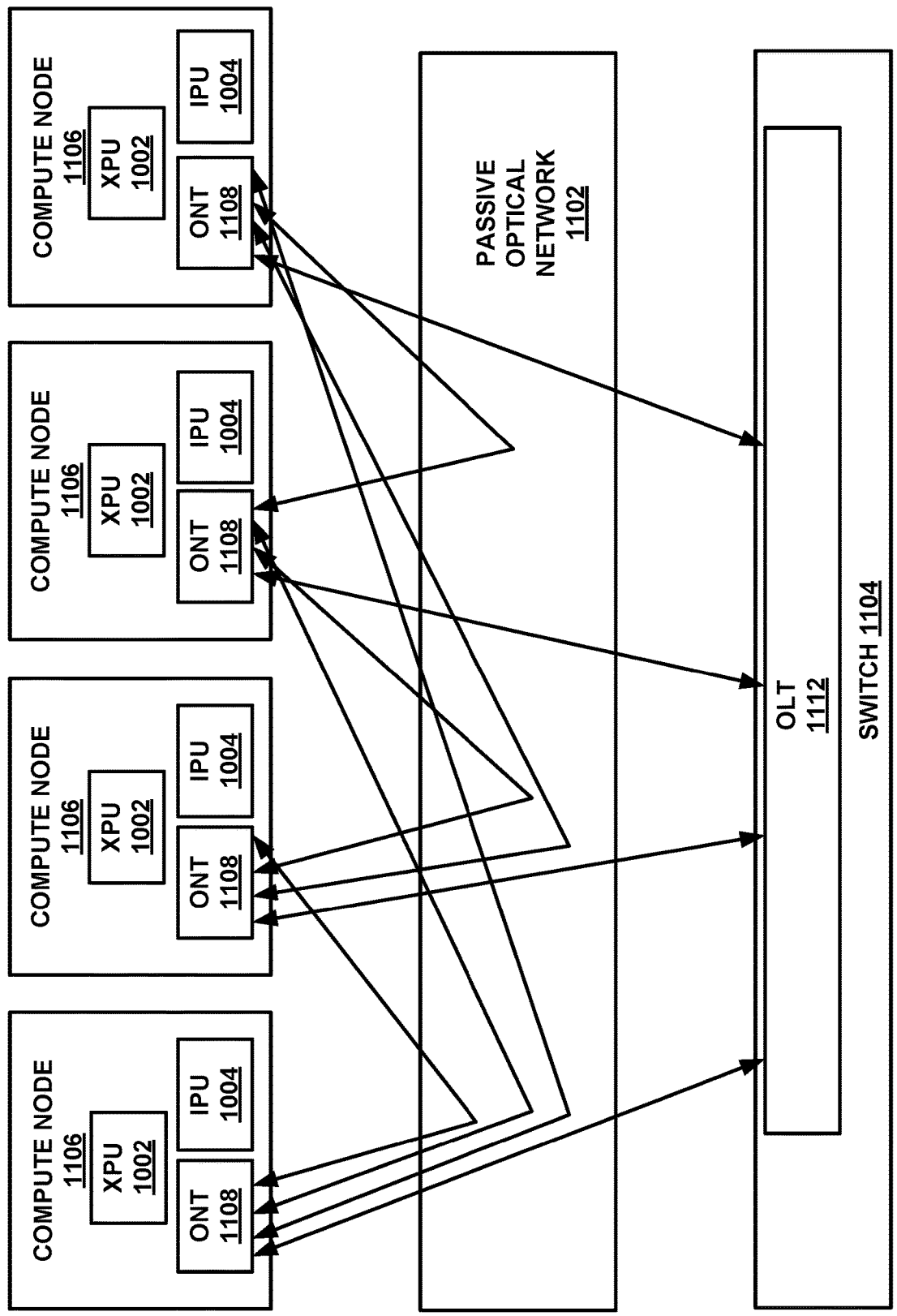
FIG. 15E illustrates optical signal paths from four compute nodes in a server through the PON to receive and transmit optical signals data to/from the compute nodes in the server and to receive and transmit optical signals from the OLT in the switch.

FIG. 15E illustrates optical signal paths from four compute nodes 1106 in a server 1120 through the PON 1102 to receive and transmit optical signals data to/from the compute nodes 1106 in the server and to receive and transmit optical signals from the OLT 1112 in the switch 1104. In an embodiment, the ONT 1108 can be coupled to Ethernet MAC-PHY circuitry in the compute node 1106 and the OLT 1112 can be coupled to Ethernet MAC-PHY circuitry in the switch 1104. The Ethernet MAC-PHY circuitry can include four ports of bidirectional 100 G Ethernet (for a combined 400 G). The four ports are connected to the PON 1102 and transmitted as four different sets of wavelengths. Each of the four wavelength sets corresponds to a single port transmitted or received from a single compute node 1106.

An embodiment has been described for a 400 G switch port with four 100 G optical signal paths. In other embodiments, the switch port could be greater than 400 G (for example, 1.6 Terabits (Tb) or higher) or less than 400 G (for example, 100 G or 50 G). An embodiment has been described for four compute nodes. In other embodiments, the number of compute nodes can be 2, 64 or greater than 64. For example, a 3.2 Terabit per second (Tbps) Ethernet connection can be connected to two compute nodes using two 1.6 Tbps optical signal paths, or to 64 compute nodes using 64 50 Gbps optical signal paths. In another embodiment, the shared 3.2 Tbps Ethernet connection can connect to all ONTs, and be shared by 32 compute nodes in both directions.

The PON 1102 can be used for High Performance Computing, Zetascale Computing, Warehouse Computing, and 5G/6G Telecom networks. In another embodiment, the PON can be used in a Virtual Radio Access Network.

It is envisioned that aspects of the embodiments herein can be implemented in various types of computing and networking equipment, such as switches, routers and blade servers such as those employed in a data center and/or server farm environment. Typically, the servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities can typically employ large data centers with a multitude of servers.

Each blade comprises a separate computing platform that is configured to perform server-type functions, that is, a "server on a card." Accordingly, each blade includes components common to conventional servers, including a main printed circuit board (main board) providing internal wiring (i.e., buses) for coupling appropriate integrated circuits (ICs) and other components mounted to the board. These components can include the components discussed earlier in conjunction with FIG. 1.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope.

Therefore, the illustrations and examples herein should be construed in an illustrative, and not a restrictive sense. The scope of the invention should be measured solely by reference to the claims that follow.

What is claimed is:

1. A data center comprising:
   a top of rack switch, a port in the top of rack switch comprising an Optical Line Terminal (OLT) to convert an electrical signal to an optical signal;
   a server comprising:
      a passive optical network (PON) to transmit the optical signal; and
      one or more compute nodes, each compute node including an Optical Network Terminal (ONT) to convert a received optical signal from the OLT to a received electrical signal.

2. The data center of claim 1, wherein the PON comprises an optical splitter, the optical splitter to split the optical signal into separate lanes, each compute node to receive a separate lane of the optical signal.

3. The data center of claim 2, wherein the optical signal is 400 Gigabits per second, the optical splitter to split the optical signal into 4 lanes, each lane is 100 Gigabits per second.

4. The data center of claim 2, wherein the optical signal is 3.2 Terabits per second, the optical splitter to split the optical signal into 64 lanes, each lane is 50 Gigabits per second.

5. The data center of claim 1, wherein the PON comprises an optical splitter, the optical splitter to split the optical signal into separate lanes, a first compute node to receive all of the separate lanes of the optical signal.

6. The data center of claim 5, wherein the PON comprises an optical splitter, the optical splitter to split the optical signal into separate lanes, a first compute node to receive one of the separate lanes of the optical signal, the first compute node to communicate with each of the other compute nodes over a different one of the separate lanes.

7. A server configurable to be associated with a switch, the server comprising:
   a passive optical network (PON) to transmit an optical signal; and
   one or more compute nodes, each compute node including an Optical Network Terminal (ONT) to convert the optical signal received from an Optical Line Terminal (OLT) to a received electrical signal;
   wherein:
      the switch comprises the OLT.

8. The server of claim 7, wherein the PON comprises an optical splitter, the optical splitter to split the optical signal into separate lanes, each compute node to receive a separate lane of the optical signal.

9. The server of claim 8, wherein the optical signal is 400 Gigabits per second, the optical splitter to split the optical signal into 4 lanes, each lane is 100 Gigabits per second.

10. The server of claim 8, wherein the optical signal is 3.2 Terabits per second, the optical splitter to split the optical signal into 64 lanes, each lane is 50 Gigabits per second.

11. The server of claim 7, wherein the PON comprises an optical splitter, the optical splitter to split the optical signal into separate lanes, a first compute node to receive all of the separate lanes of the optical signal.

12. The server of claim 11, wherein the PON comprises an optical splitter, the optical splitter to split the optical signal into separate lanes, a first compute node to receive one of the separate lanes of the optical signal, the first compute node to communicate with each of the other compute nodes over a different one of the separate lanes.

13. The server of claim 7, wherein the one or more compute nodes include an Infrastructure Processing Unit (IPU).

14. The server of claim 13, wherein the IPU can be a Central processing unit (CPU), graphics processing unit (GPU), general purpose GPU (GPGPU), field programmable gate array (FPGA), Accelerated Processing Unit (APU), Artificial Intelligence processing Unit (AIPU), an Image/Video Processing Unit (VPU), accelerator or another processor.

15. A method comprising:
converting, by an Optical Line Terminal (OLT) in a top of rack switch an electrical signal to an optical signal;
transmitting, by a passive optical network (PON) in a server, the optical signal; and
converting, by an Optical Network Terminal (ONT) in one or more compute nodes in the server, an optical signal received from the OLT to a received electrical signal.

16. The method of claim 15, further comprising:
splitting, by an optical splitter in the PON, the optical signal into separate lanes; and
receiving, by each compute node, a separate lane of the optical signal.

17. The method of claim 16, wherein the optical signal is 400 Gigabits per second, the optical splitter to split the optical signal into 4 lanes, each lane is 100 Gigabits per second.

18. The method of claim 16, wherein the optical signal is 3.2 Terabits per second, the optical splitter to split the optical signal into 64 lanes, each lane is 50 Gigabits per second.

19. The method of claim 15, further comprising:
splitting, by an optical splitter in the PON, the optical signal into separate lanes; and
receiving, by a first compute node, all of the separate lanes of the optical signal.

20. The method of claim 19, further comprising:
splitting, by an optical splitter in the PON, the optical signal into separate lanes;
receiving, by a first compute node, one of the separate lanes of the optical signal; and
communicating, by the first compute node, with each of the other compute nodes over a different one of the separate lanes.

* * * * *